United States Patent
Tozawa et al.

(10) Patent No.: US 12,304,814 B2
(45) Date of Patent: May 20, 2025

(54) PHOTODECOMPOSITION MODULE, PHOTODECOMPOSITION CELL, DECOMPOSITION SYSTEM, LIVING ENVIRONMENT SUSTAINING SYSTEM, AND SUPPLY AMOUNT ADJUSTMENT SYSTEM

(71) Applicants: NATIONAL UNIVERSITY CORPORATION KOBE UNIVERSITY, Kobe (JP); KANEKA CORPORATION, Osaka (JP)

(72) Inventors: Tomokazu Tozawa, Osaka (JP); Takashi Tachikawa, Kobe (JP)

(73) Assignees: NATIONAL UNIVERSITY CORPORATION KOBE UNIVERSITY, Kobe (JP); KANEKA CORPORATION, Osaka (JP)

( * ) Notice: Subject to any disclaimer, the term of this patent is extended or adjusted under 35 U.S.C. 154(b) by 562 days.

(21) Appl. No.: 17/635,351

(22) PCT Filed: Aug. 31, 2020

(86) PCT No.: PCT/JP2020/032927
§ 371 (c)(1),
(2) Date: Feb. 14, 2022

(87) PCT Pub. No.: WO2021/045017
PCT Pub. Date: Mar. 11, 2021

(65) Prior Publication Data
US 2022/0274829 A1    Sep. 1, 2022

(30) Foreign Application Priority Data
Sep. 6, 2019   (JP) ................................ 2019-163198

(51) Int. Cl.
*C01B 3/04*       (2006.01)
*C25B 9/015*      (2021.01)
(Continued)

(52) U.S. Cl.
CPC ................ *C01B 3/04* (2013.01); *C25B 9/015* (2021.01); *C25B 9/23* (2021.01); *C25B 9/63* (2021.01)

(58) Field of Classification Search
CPC .. C01B 3/04; C25B 9/015; C25B 9/23; C25B 9/63; C25B 9/13; C25B 9/50;
(Continued)

(56) References Cited

U.S. PATENT DOCUMENTS

2012/0064420 A1    3/2012  Machida et al.
2015/0252483 A1    9/2015  Ono et al.
(Continued)

FOREIGN PATENT DOCUMENTS

JP    2006104571 A  *  4/2006
JP    2012059664 A     3/2012
(Continued)

OTHER PUBLICATIONS

International Bureau of WIPO, International Preliminary Report on Patentability Issued in Application No. PCT/JP2020/032927, Mar. 8, 2022, WIPO, 9 pages.

*Primary Examiner* — Jacob M Amick
*Assistant Examiner* — Charles J Brauch
(74) *Attorney, Agent, or Firm* — Alleman Hall & Tuttle LLP

(57) ABSTRACT

The present invention provides a photodecomposition module and a photodecomposition cell that have a new structure different from a known art and can decompose a decomposition liquid more effectively than those of the known art. The present invention includes a plurality of photodecomposition cells, and a posture holder that holds each of the photodecomposition cells in a predetermined posture, in which each of the photodecomposition cells decomposes a decomposition liquid with light irradiation, and includes an (Continued)

anode electrode part and a cathode electrode part in an accommodating part, the anode electrode part has a photocatalyst supported on a conductive substrate, the anode electrode part and the cathode electrode part are immersed in the decomposition liquid in the accommodating part, and the accommodating part has a cylindrical shape.

10 Claims, 26 Drawing Sheets

(51) Int. Cl.
    *C25B 9/23*     (2021.01)
    *C25B 9/63*     (2021.01)

(58) Field of Classification Search
    CPC ......... C25B 11/052; C25B 15/08; C25B 1/04; C25B 9/00; C25B 9/70; C25B 11/067; C25B 11/087; H01M 8/0656
    See application file for complete search history.

(56) References Cited

U.S. PATENT DOCUMENTS

| | | |
|---|---|---|
| 2017/0370012 A1 | 12/2017 | Ono et al. |
| 2019/0127867 A1 | 5/2019 | Yonezawa et al. |

FOREIGN PATENT DOCUMENTS

| | | |
|---|---|---|
| JP | 2013144616 A | 7/2013 |
| JP | 2013213231 A | 10/2013 |
| JP | 2014101550 A | 6/2014 |
| JP | 2015196869 A | 11/2015 |
| JP | 2015206085 A | 11/2015 |
| JP | 2017024956 A | 2/2017 |
| JP | 3209008 U | 3/2017 |
| JP | 2018087368 A | 6/2018 |
| JP | 2019085602 A | 6/2019 |
| WO | 2013021509 A1 | 2/2013 |
| WO | 2018203285 A1 | 11/2018 |

* cited by examiner

PHOTODECOMPOSITION MODULE, PHOTODECOMPOSITION CELL, DECOMPOSITION SYSTEM, LIVING ENVIRONMENT SUSTAINING SYSTEM, AND SUPPLY AMOUNT ADJUSTMENT SYSTEM

TECHNICAL FIELD

The present invention mainly relates to a photodecomposition module, a photodecomposition cell, a decomposition system, a living environment sustaining system, and a supply amount adjustment system that decompose a decomposition liquid to evolve hydrogen gas.

BACKGROUND ART

Conventionally, a photodecomposition module that receives sunlight and decomposes water into hydrogen gas and oxygen gas is known (for example, Patent Document 1). Such a photodecomposition module can produce hydrogen gas from water without using fossil fuel when a power source derived from renewable energy such as a solar cell is connected to an auxiliary power supply. Therefore, the photodecomposition module is considered to be environmentally friendly.

PRIOR ART DOCUMENTS

Patent Documents

Patent Document 1: JP 2015-196869 A

DISCLOSURE OF INVENTION

Technical Problem

In order to industrially produce and popularize a photodecomposition module, the photodecomposition module is required to have a simple structure while ensuring durability. In addition, in order to mount hydrogen gas required for energy supply in response to demand, it is essential to increase a size of the photodecomposition module.

However, since the photodecomposition module disclosed in Patent Document 1 is formed by stacking each member in a layer and pressure-bonding each member with a bolt, there are many joints between the members on a side surface. Thus, when the size is increased, a side surface of a device casing is lengthened, and a problem reducing reliability, such as leakage of a decomposition liquid inside from the joint of the side surface, is likely to occur.

As a result, it is necessary to increase a fastening structure using the bolt, which leads to an increase in manufacturing cost and device weight. Thus, the photodecomposition module disclosed in Patent Document 1 is operable experimentally but difficult to use commercially.

In the photodecomposition module disclosed in Patent Document 1, oxygen gas is generated on an anode side, and the generated oxygen gas is stored in an oxygen tank or released to atmosphere. That is, Patent Document 1 does not disclose any use of oxygen gas as oxidant gas evolved on the anode side.

Further, in the photodecomposition module disclosed in Patent Document 1, hydrogen gas is generated on a cathode side, and the generated hydrogen gas is stored in a hydrogen tank as it is or supplied to a fuel cell. Therefore, the generated hydrogen gas contains a large amount of water vapor, and there is a problem that a hydrogen gas having high purity cannot be obtained.

An object of the present invention is to provide a photodecomposition module and a photodecomposition cell that have a new structure different from a known art, can decompose a decomposition liquid more effectively than the known art, and can generate hydrogen gas from the decomposition liquid.

In addition, the present invention has an object to provide a decomposition system, a living environment sustaining system, and a supply amount adjustment system that generate hydrogen gas by decomposing a decomposition liquid and can use decomposition of the decomposition liquid more effectively.

Solution to Problem

One aspect of the present invention for solving the above problems is a photodecomposition module including: a plurality of photodecomposition cells; and a posture holder that holds each of the photodecomposition cells in a predetermined posture, wherein each of the photodecomposition cells decomposes a decomposition liquid with light irradiation, including an anode electrode part and a cathode electrode part in an accommodating part, wherein the anode electrode part includes a photocatalyst supported on a conductive substrate, wherein the anode electrode part and the cathode electrode part are immersed in the decomposition liquid in the accommodating part, and wherein the accommodating part has a cylindrical shape.

The term "cylindrical shape" as used herein refers to a hollow shape extending in a predetermined direction as a whole, and includes not only a case where an outer shape of a cross section orthogonal to an axial direction (longitudinal direction) is a circular shape but also a case where the outer shape is a polygonal shape and a case where the outer shape is an elliptical shape and an oval shape.

In this aspect, the plurality of photodecomposition cells are provided, and the decomposition liquid can be decomposed in each photodecomposition cell. Thus, the decomposition liquid can be decomposed more effectively than when the decomposition liquid (for example, water) is decomposed in one photodecomposition cell as in Patent Document 1.

In this aspect, the accommodating part, which accommodates the anode electrode part and the cathode electrode part, has a cylindrical shape, has high strength against bending and compression of the accommodating part, and is hardly deformed. Therefore, the accommodating part is hardly damaged by external force, and is highly reliable.

In a preferred aspect, the anode electrode part includes a plurality of anode electrode pieces arranged side by side in an axial direction of the accommodating part with electrical connection to each other In a preferred aspect, each of the photodecomposition cells is independently attachable to and detachable from the posture holder.

In a preferred aspect, the accommodating part is configured to transmit light in a direction intersecting with an axial direction, the posture holder includes a reflector that reflects light, and the posture holder holds the photodecomposition cell so that the photocatalyst of the conductive substrate faces the reflector.

In a preferred aspect, the photodecomposition cell decomposes the decomposition liquid to evolve gas with light irradiation, further including an ion exchanger in the accommodating part, the ion exchanger is provided between the anode electrode part and the cathode electrode part to divide an inside of the accommodating part into a first gas evolution space to which the anode electrode part belongs and a second gas evolution space to which the cathode electrode part belongs, the accommodating part is provided with a liquid level adjusting hole that communicates the first gas evolution space with the second gas evolution space to adjust a liquid level of the decomposition liquid, and the photodecomposition module includes a first gas discharge part that communicates the first gas evolution space with an outside and a second gas discharge part that communicates the second gas evolution space with the outside.

In a preferred aspect, the plurality of photodecomposition cells are electrically connected to each other.

In a preferred aspect, the photodecomposition cell incudes a holding recess that holds an end of the anode electrode part, and the holding recess extends in an axial direction of the accommodating part over the accommodating part, satisfying either following (1) or (2):

(1) the holding recess is a recessed groove that is a cut-out portion of the inner wall of the accommodating part; or (2) the accommodating part incudes a pair of protrusions protruding from the inner wall of the accommodating part, and the holding recess is a recessed groove sandwiched between the pair of protrusions with a depth toward the inner wall of the accommodating part.

In a preferred aspect, the photodecomposition cell includes a wiring line and a holding recess, the anode electrode part includes a plurality of anode electrode pieces, the wiring line electrically connects the anode electrode pieces to each other, the holding recess extends in an axial direction of the accommodating part and holds an end of each of the anode electrode pieces, and the wiring line is disposed between a bottom of the holding recess and an end surface of each of the anode electrode pieces.

In a preferred aspect, the posture holder is configured to rotate the photodecomposition cell in a circumferential direction.

In a preferred aspect, the photodecomposition cell decomposes the decomposition liquid and evolves gas with light irradiation, the photodecomposition cell includes a gas discharge part at an end in an axial direction of the accommodating part, and the posture holder holds the photodecomposition cell such that the axial direction of the accommodating part intersects with a horizontal plane.

In a preferred aspect, a liquid supply part that supplies the decomposition liquid is included, and the liquid supply part supplies the decomposition liquid toward the photocatalyst of the anode electrode part.

One aspect of the present invention is a photodecomposition module including: a plurality of photodecomposition cells; and a posture holder that holds each of the photodecomposition cells in a predetermined posture, wherein each of the photodecomposition cell decomposes a decomposition liquid with light irradiation, including an anode electrode part and a cathode electrode part in an accommodating part, wherein the anode electrode part incudes a photocatalyst supported on a conductive substrate, and each of the photodecomposition cells is independently attachable to and detachable from the posture holder.

In this aspect, the plurality of photodecomposition cells are provided, and the decomposition liquid can be individually decomposed in each photodecomposition cell, and thus the decomposition liquid can be decomposed more effectively.

In this aspect, since each of the photodecomposition cells is attachable to and detachable from the posture holder, even when one of the photodecomposition cells fails, maintenance such as replacement with a new photodecomposition cell is facilitated.

One aspect of the present invention is a photodecomposition module including: a plurality of photodecomposition cells; and a posture holder that holds each of the photodecomposition cells in a predetermined posture, wherein each of the photodecomposition cells decomposes a decomposition liquid with light irradiation, including an anode electrode part and a cathode electrode part in an accommodating part, wherein the accommodating part is configured to transmit light, wherein the anode electrode part includes a photocatalyst supported on a conductive substrate, wherein the posture holder includes a reflector that reflects light, and wherein the posture holder holds the photodecomposition cell such that the photocatalyst of the conductive substrate faces the reflector.

In this aspect, the plurality of photodecomposition cells are provided, and the decomposition liquid can be decomposed in each photodecomposition cell, and thus the decomposition liquid can be decomposed more effectively.

In this aspect, since the reflector of the posture holder faces the photocatalyst of the conductive substrate, reflected light from the reflector can also be used for a reaction in the photocatalyst, and decomposition efficiency can be improved.

One aspect of the present invention is a photodecomposition cell that decomposes a decomposition liquid with light irradiation, the photodecomposition cell including an anode electrode part and a cathode electrode part in an accommodating part having a cylindrical shape, wherein the anode electrode part and the cathode electrode part are immersed in the decomposition liquid in the accommodating part, wherein the anode electrode part incudes a photocatalyst supported on a conductive substrate, including a plurality of anode electrode pieces, and wherein the plurality of anode electrode pieces are arranged side by side in an axial direction of the accommodating part with electrical connection to each other.

In this aspect, the anode electrode part includes the plurality of anode electrode pieces, and the anode electrode pieces are electrically connected to each other, a reaction area of the electrode carrying the photocatalyst can be easily increased, and the decomposition liquid can be decomposed more effectively.

One aspect of the present invention is a photodecomposition cell that decomposes a decomposition liquid with light irradiation, the photodecomposition cell including an anode electrode part and a cathode electrode part in an accommodating part, wherein the accommodating part includes a light transmitter that transmits light and a reflector that reflects light, wherein the anode electrode part includes a photocatalyst supported on a transparent conductive substrate, wherein the anode electrode part is located between the light transmitter and the reflector, and wherein the photocatalyst of the transparent conductive substrate faces the reflector.

In this aspect, the reflected light from the reflector can also be used for the reaction in the photocatalyst, and the decomposition efficiency can be improved. Therefore, the decomposition liquid can be decomposed more effectively.

One aspect of the present invention is a decomposition system including: a decomposer; an anode collector; and a booth, wherein the decomposer decomposes a decomposition liquid, including an anode electrode part and a cathode electrode part, generating hydrogen gas at the cathode electrode part and an anode product at the anode electrode part, wherein the anode electrode part and the cathode electrode part are immersed in the decomposition liquid, wherein the anode collector collects the decomposition liquid including the anode product to supply the decomposition liquid as an oxidant liquid to the booth, and wherein the booth includes a spray part configured to spray the oxidant liquid.

In this aspect, since the hydrogen gas can be generated by decomposing the decomposition liquid, the generated hydrogen gas can be used as the fuel gas of the fuel cell, for example.

In this aspect, for example, by placing an object to be disinfected into the booth, the oxidant liquid can be sprayed from the spray part in the booth, and thus viruses and bacteria on the object to be disinfected can be disinfected.

One aspect of the present invention is a decomposition system including: a decomposer; an anode collector; and a booth, wherein the decomposer decomposes a decomposition liquid, including an anode electrode part and a cathode electrode part, generating hydrogen gas at the cathode electrode part and an anode product at the anode electrode part, wherein the anode electrode part and the cathode electrode part are immersed in the decomposition liquid, and wherein the anode collector collects the anode product to oxidize the anode product into oxidant gas, thereafter supplying the oxidant gas to the booth.

In this aspect, since the hydrogen gas can be generated by decomposing the decomposition liquid, the generated hydrogen gas can be used as the fuel gas of the fuel cell, for example.

In this aspect, for example, by placing the object to be disinfected in the booth and exposing the object to be disinfected to an oxidant gas, viruses and bacteria attached to the object to be disinfected can be disinfected.

One aspect of the present invention is a decomposition system including: a decomposer; a cathode collector; and a supply part, wherein the decomposer decomposes a decomposition liquid, including an anode electrode part and a cathode electrode part, generating hydrogen gas at the cathode electrode part, wherein the anode electrode part and the cathode electrode part are immersed in the decomposition liquid, wherein the cathode collector collects the hydrogen gas generated in the cathode electrode part to perform deliquoring of the hydrogen gas, thereafter supplying the hydrogen gas to the supply part, and wherein the supply part is configured to attach and detach a hydrogen tank, being configured to supply the hydrogen gas to the hydrogen tank after the deliquoring when the hydrogen tank is attached.

In a preferred aspect, a cathode collector and a supply part are included, wherein the cathode collector collects hydrogen gas generated in the cathode electrode part to perform deliquoring of the hydrogen gas, thereafter supplying the hydrogen gas to the supply part, wherein the supply part is configured to attach a hydrogen tank thereto and detach therefrom, thereby enabling the hydrogen gas to be supplied to the hydrogen tank when the hydrogen tank is attached.

In the above aspect, since the generated hydrogen gas can be supplied to the hydrogen tank and the hydrogen tank is attachable to and detachable from the cathode collector, for example, by replacing the hydrogen tank in which the hydrogen gas is stored to a predetermined amount with an empty hydrogen tank, the generated hydrogen gas can be put into the hydrogen tank and used with almost no waste.

In the above aspect, since the decomposition liquid is removed from the hydrogen gas, the hydrogen gas having high purity can be stored in the hydrogen tank.

One aspect of the present invention is a living environment sustaining system including the above decomposition system and a power generator that generates power using the hydrogen gas.

In this aspect, hydrogen gas can be generated by the decomposition system, and power can be generated using the hydrogen gas generated by the power generator, and thus a living at or above a certain level can be sustained.

One aspect of the present invention is a supply amount adjustment system including: the above decomposition system; and a deterioration prediction unit predicting a deterioration state of the decomposer, wherein the supply amount adjustment system adjusts a supply amount of the oxidant liquid to the booth based on the deterioration state of the decomposer predicted by the deterioration prediction unit.

One aspect of the present invention is a supply amount adjustment system including: the above decomposition system; and a deterioration prediction unit predicting a deterioration state of the decomposer, wherein the supply amount adjustment system adjusts a supply amount of the oxidant gas to the booth based on the deterioration state of the decomposer predicted by the deterioration prediction unit.

In the above aspect, since the supply amount to the booth can be adjusted on the basis of a deterioration state of the decomposer, the decomposer is less likely to be overloaded.

One aspect of the present invention is a supply amount adjustment system including: the above decomposition system; and a deterioration prediction unit predicting a deterioration state of the decomposer, wherein the supply amount adjustment system adjusts a supply amount of the hydrogen gas to the hydrogen tank based on the deterioration state of the decomposer predicted by the deterioration prediction unit.

In this aspect, since the supply amount to the hydrogen tank can be adjusted on the basis of the deterioration state of the decomposer, the decomposer is less likely to be overloaded.

Effect of Invention

The present invention can decompose the decomposition liquid more effectively than the known art and generate hydrogen gas from the decomposition liquid.

The present invention decomposes the decomposition liquid to generate hydrogen gas and can utilize the decomposition of the decomposition liquid more effectively.

BRIEF DESCRIPTION OF DRAWINGS

FIGS. 12A and 12B are explanatory diagrams of the photodecomposition module in FIG. 3, wherein FIG. 12A is a piping system diagram, and FIG. 12B is an electric circuit diagram.

FIGS. 13A and 13B are explanatory views of a cathode collector in FIG. 2, wherein FIG. 13A is a cross-sectional view of the cathode collector in a closed posture, and FIG. 13B is a cross-sectional view of the cathode collector in an open posture.

FIGS. 17A and 17B are explanatory views of a cathode collector in FIG. 16, wherein FIG. 17A is a cross-sectional view of the cathode collector in a closed posture, and FIG. 17B is a cross-sectional view of the cathode collector in an open posture.

FIGS. 21A to 21C are cross-sectional views of photodecomposition cells according to other embodiments of the present invention, wherein FIG. 12A illustrates a case where a cross-sectional shape of the cylinder is a square, FIG. 12B illustrates a case where the cross-sectional shape of the cylinder is a regular hexagon, and FIG. 12C illustrates a case where the cross-sectional shape of the cylinder is an ellipse.

BEST MODE FOR CARRYING OUT THE INVENTION

Figure 3:
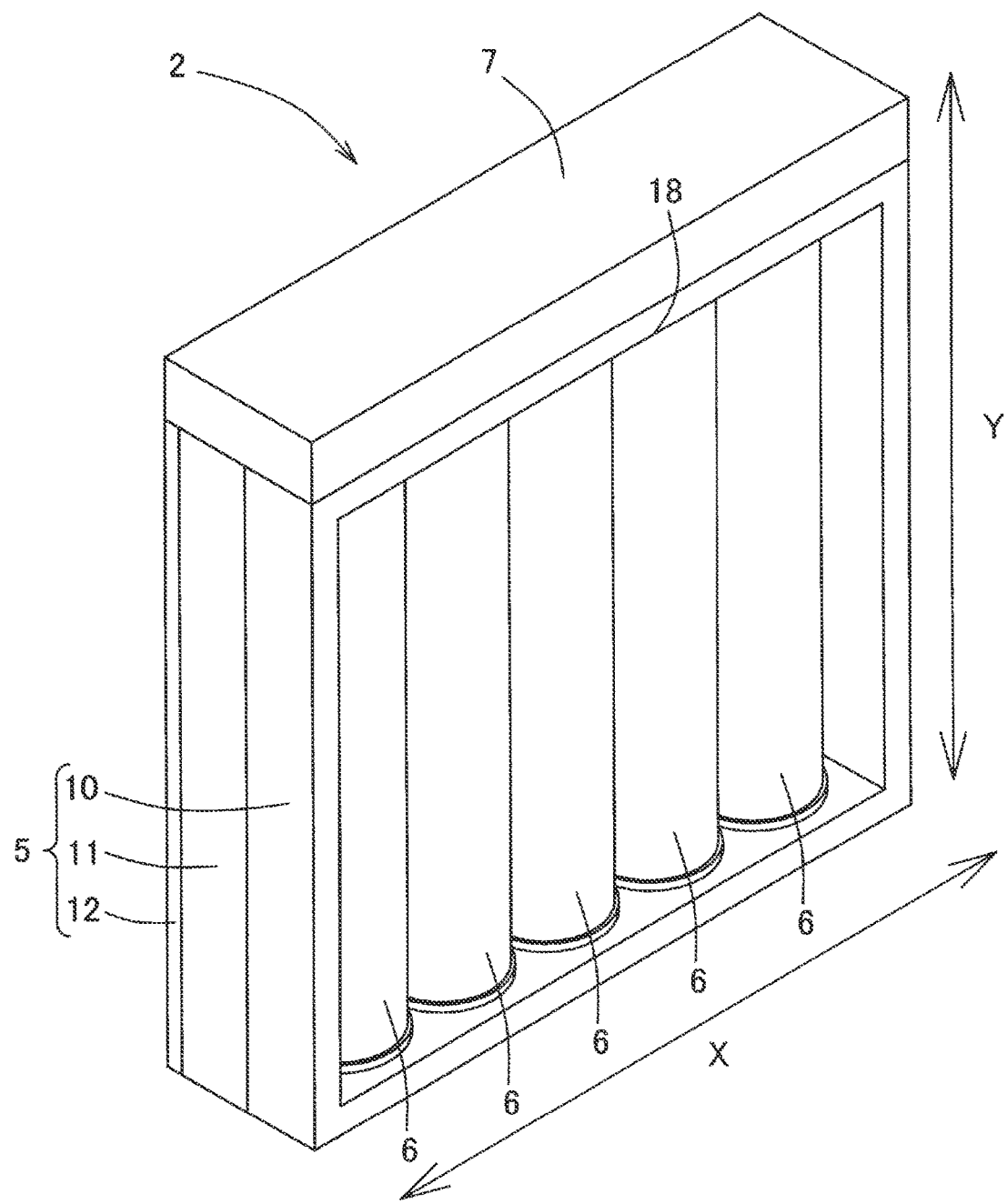
FIG. 3 is a schematic perspective view of a photodecomposition module in FIG. 1.

Hereinafter, embodiments of the present invention will be described in detail. Note that a longitudinal posture in FIG. 3 is used as a reference for up, down, left, right, front, and rear directions.

Figure 1:
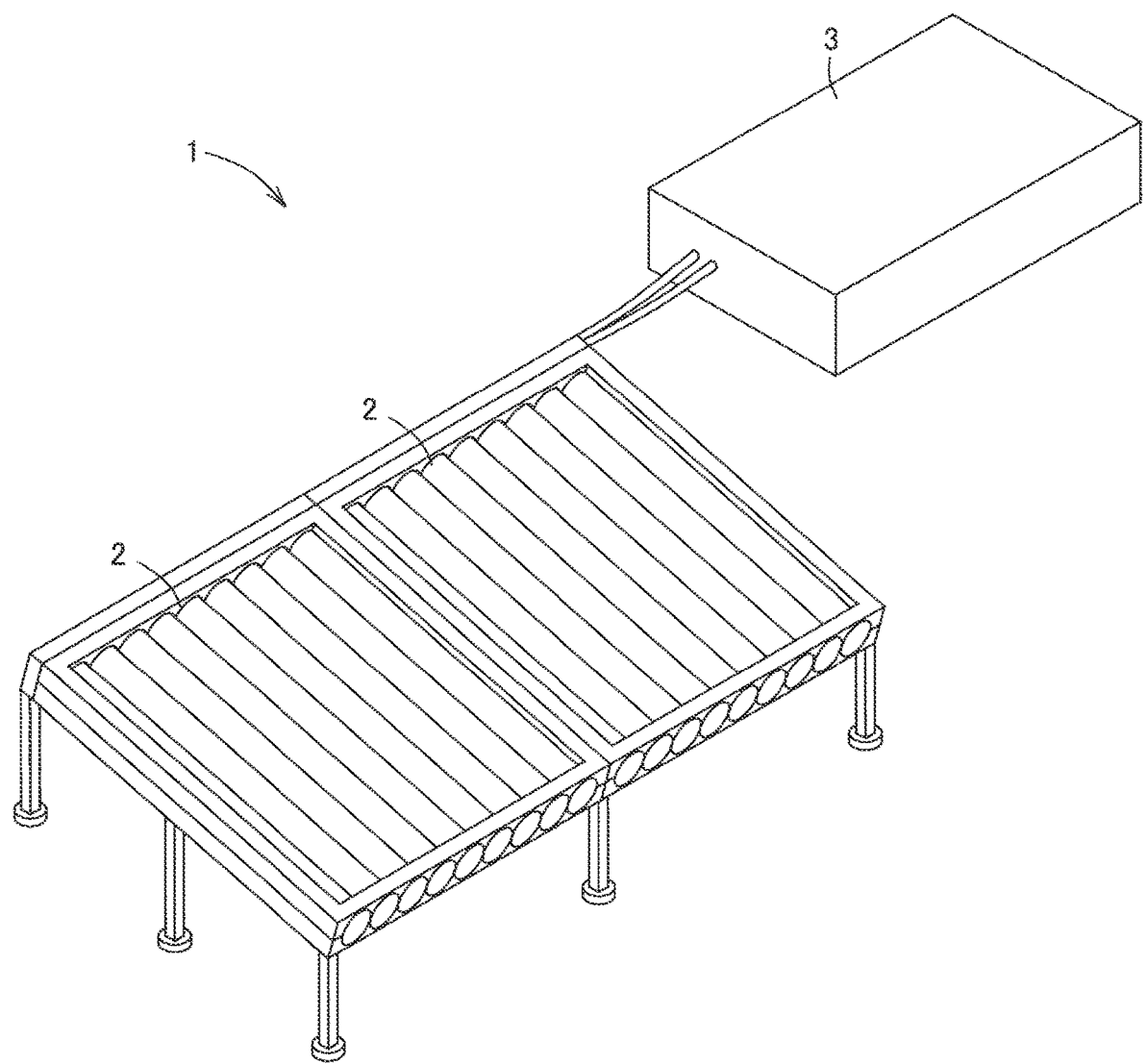
FIG. 1 is a schematic perspective view illustrating an installation state of a hydrogen production device according to a first embodiment of the present invention.

As shown in FIG. 1, a hydrogen production device 1 (decomposition system, supply amount adjustment system) according to a first embodiment of the present invention is provided mainly on the ground of an idle land or on the ground in a site of a building such as a public facility, a hospital, a welfare facility, or a shelter (for example, the ground of a parking lot).

Figure 2:
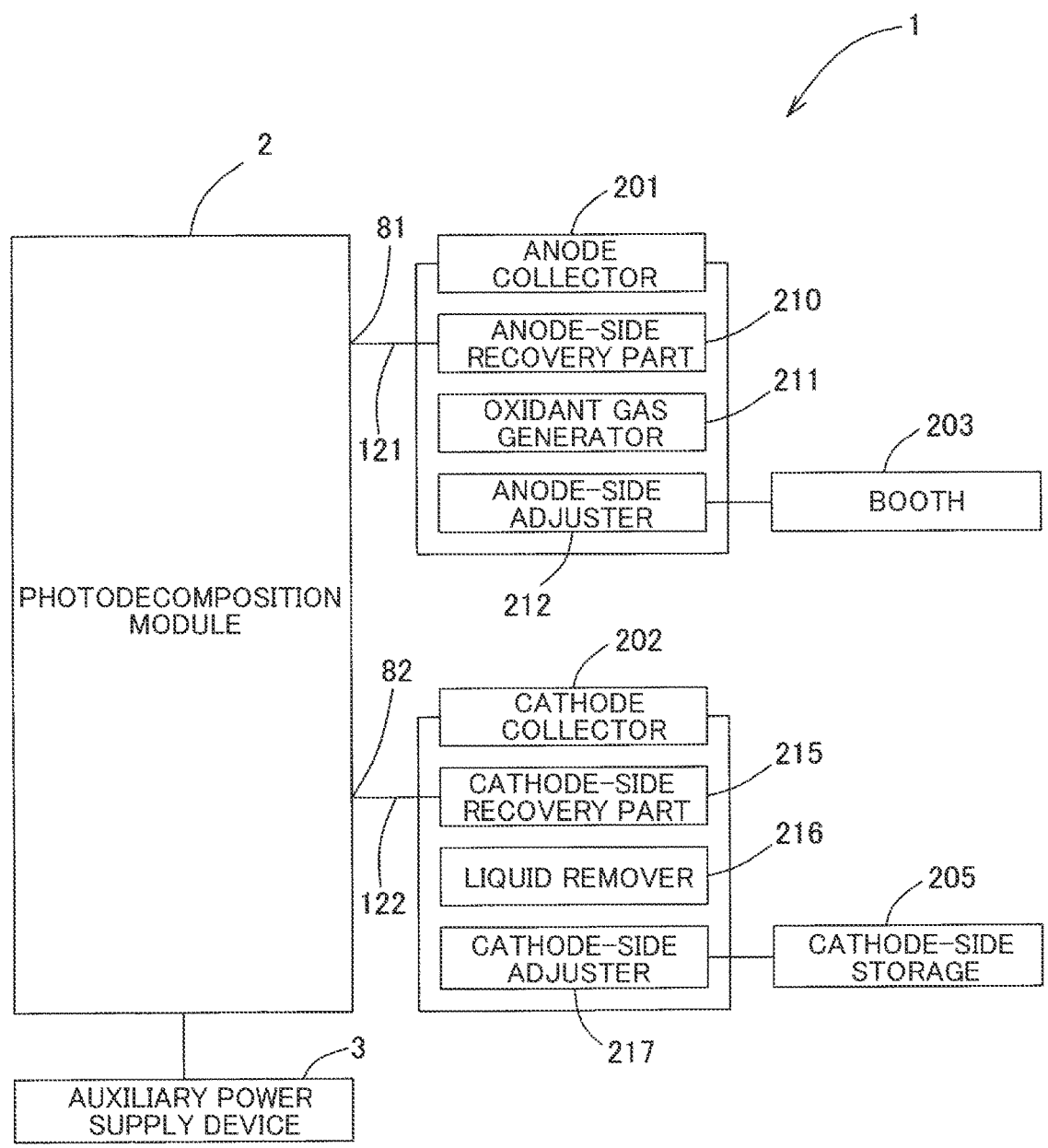
FIG. 2 is a configuration diagram of the hydrogen production device in FIG. 1.

As shown in FIGS. 1 and 2, the hydrogen production device 1 includes a photodecomposition module 2 (decomposer) and an auxiliary power supply device 3, and decomposes water as a decomposition liquid in the photodecomposition module 2 using photovoltaic power generated when the photodecomposition module 2 receives light such as sunlight and supply power supplied from the auxiliary power supply device 3 to produce hydrogen gas and oxygen gas.

As shown in FIG. 2, the hydrogen production device 1 includes an anode collector 201 that collects oxygen gas as anode generating gas, a cathode collector 202 that collects hydrogen gas as cathode generating gas, and a booth 203 capable of accommodating an object 180 to be disinfected, and a cathode-side storage 205 is attachable to and detachable from the cathode collector 202.

The hydrogen production device 1 has a disinfection function, and can disinfect the object 180 to be disinfected accommodated in the booth 203 by converting oxygen gas into oxidant gas in the anode collector 201 and supplying the oxidant gas to the booth 203.

In terms of hygiene and electric power, it is preferable that the hydrogen production device 1 is provided together with a power generator that uses hydrogen gas as fuel, such as a fuel cell. Further, it is preferable that the hydrogen production device 1 constitutes a living environment sustaining system that ensures living in public facilities, schools, hospitals, welfare facilities, and shelters through a disinfection function and a fuel generation function, thereby sustaining a life at or above a certain level.

The photodecomposition module 2 is a hydrogen evolution module that evolves hydrogen gas, and is also an oxygen evolution module that evolves oxygen gas.

As shown in FIG. 3, the photodecomposition module 2 is a plate panel that spreads in a planar shape and receives light from one main surface. The photodecomposition module 2 according to the present embodiment is a quadrangular panel spreading in a longitudinal direction Y and a lateral direction X.

The photodecomposition module 2 includes a posture holder 5, a plurality of photodecomposition cells 6, and a pipe structure 7, and each of the photodecomposition cells 6 is independently attachable to and detachable from the posture holder 5 and the pipe structure 7.

The posture holder 5 is a part that holds each photodecomposition cell 6 in a predetermined posture.

Figure 4:
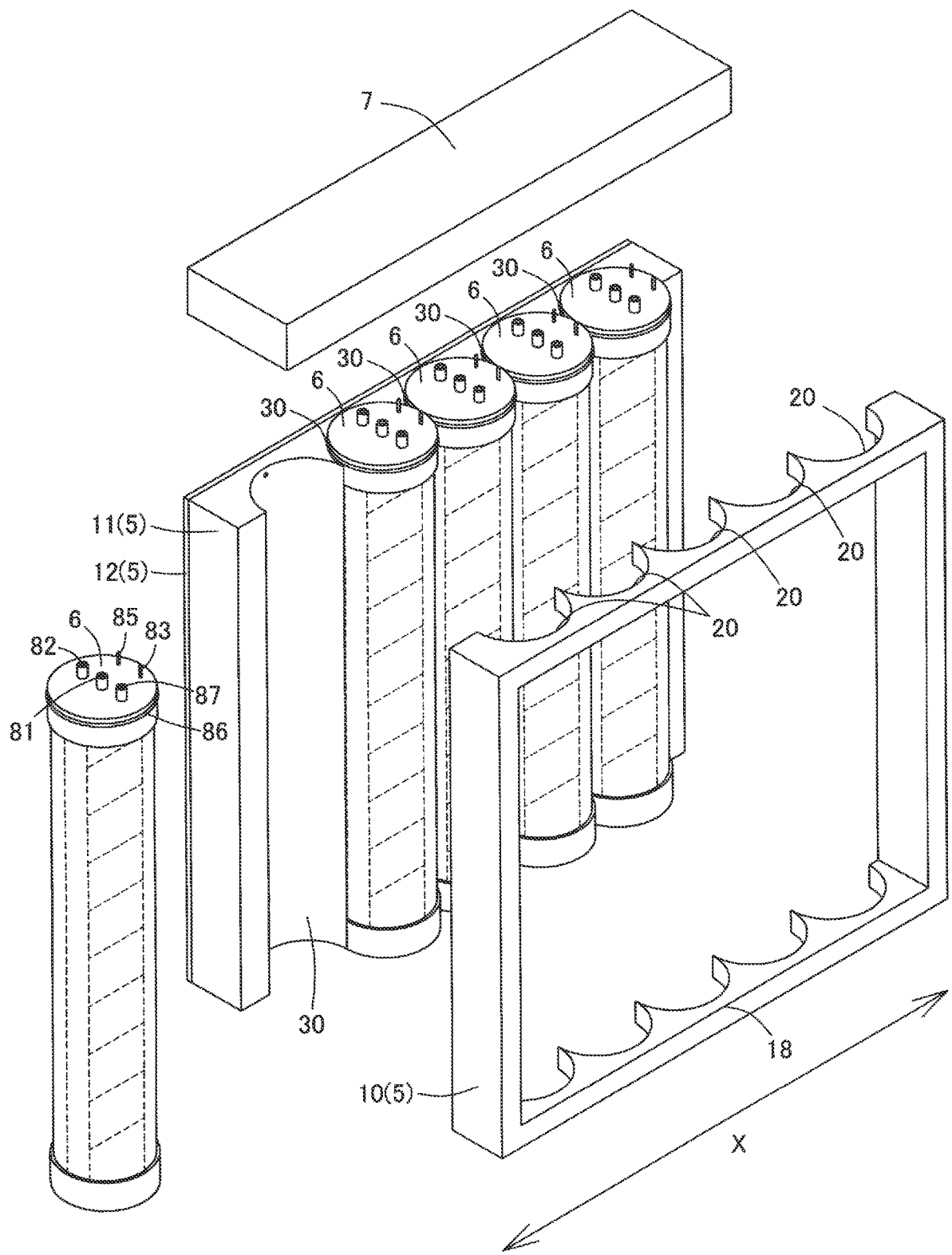
FIG. 4 is an exploded perspective view of the photodecomposition module in FIG. 3.

As illustrated in FIG. 4, the posture holder 5 includes a first holder 10, a second holder 11, and a reflector 12, and the first holder 10 and the second holder 11 are attachable to and detachable from each other.

The first holder 10 is a frame that covers a part of each photodecomposition cell 6 and has a "square" shape when viewed from the front, and includes a light transmission hole 18 and a plurality of first recesses 20 as shown in FIG. 4.

The light transmission hole 18 is a through hole having a quadrangular opening when viewed from the front and penetrating in a thickness direction of the first holder 10.

The first recess 20 is a recessed groove having a depth in the thickness direction from the other main surface (surface of the second holder 11 side) of the first holder 10 and linearly extending in the longitudinal direction Y. The first recess 20 has a shape conforming to an outer shape of the photodecomposition cell 6, and is a notched groove having a semicircular opening shape in the present embodiment.

As shown in FIG. 4, the second holder 11 is a part that holds each photodecomposition cell 6 together with the first holder 10 interposing the photodecomposition cell 6 therebetween, has translucency, and allows light to be transmitted in the thickness direction.

The second holder 11 includes a plurality of second recesses 30 on a surface of the first holder 10 side when the posture holder 5 is assembled at positions corresponding to the first recesses 20.

The second recesses 30 is a part that accommodates the photodecomposition cell 6 together with the first recess 20, and is a recessed groove extending linearly in the longitudinal direction Y and having a depth in the thickness direction from the main surface of the first holder 10 side of the second holder 11. The second recess 30 has a shape conforming to the outer shape of the photodecomposition cell 6, and is a semicircular notched groove in the present embodiment.

As illustrated in FIG. 4, the reflector 12 constitutes a back surface of the photodecomposition module 2, and is a part that reflects light incident from a front surface (a surface of the first holder 10 side) and transmitted through the photodecomposition cell 6 toward the photodecomposition cell 6 side again.

The reflector 12 is not limited as long as having a light reflecting function. For example, the reflector can be constituted by a material constituting a mirror surface such as a metal foil or a metal sheet of silver, aluminum, gold, copper, nickel, platinum, or tin.

The reflector 12 covers at least most of a surface on a rear side of the second holder 11, and covers the entire surface on the rear side of the second holder 11 in the present embodiment.

The photodecomposition cell 6 is irradiated with light to decompose water as a decomposition liquid into hydrogen gas as cathode generating gas and oxygen gas as anode generating gas.

Figure 5:
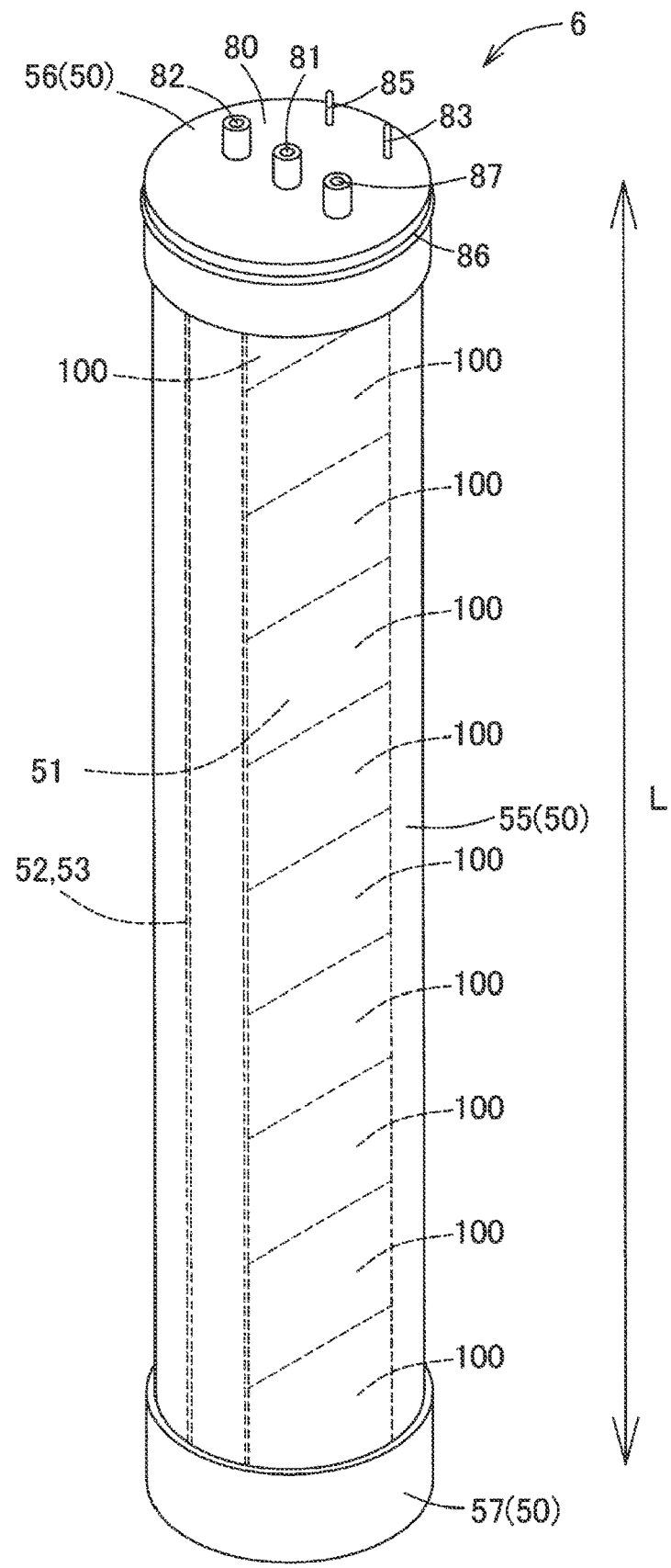
FIG. 5 is a perspective view of a photodecomposition cell in FIG. 4.

As illustrated in FIG. 5, the photodecomposition cell 6 includes an anode electrode part 51, a cathode electrode part 52, and an ion exchanger 53 in an accommodating part 50.

Figure 6:
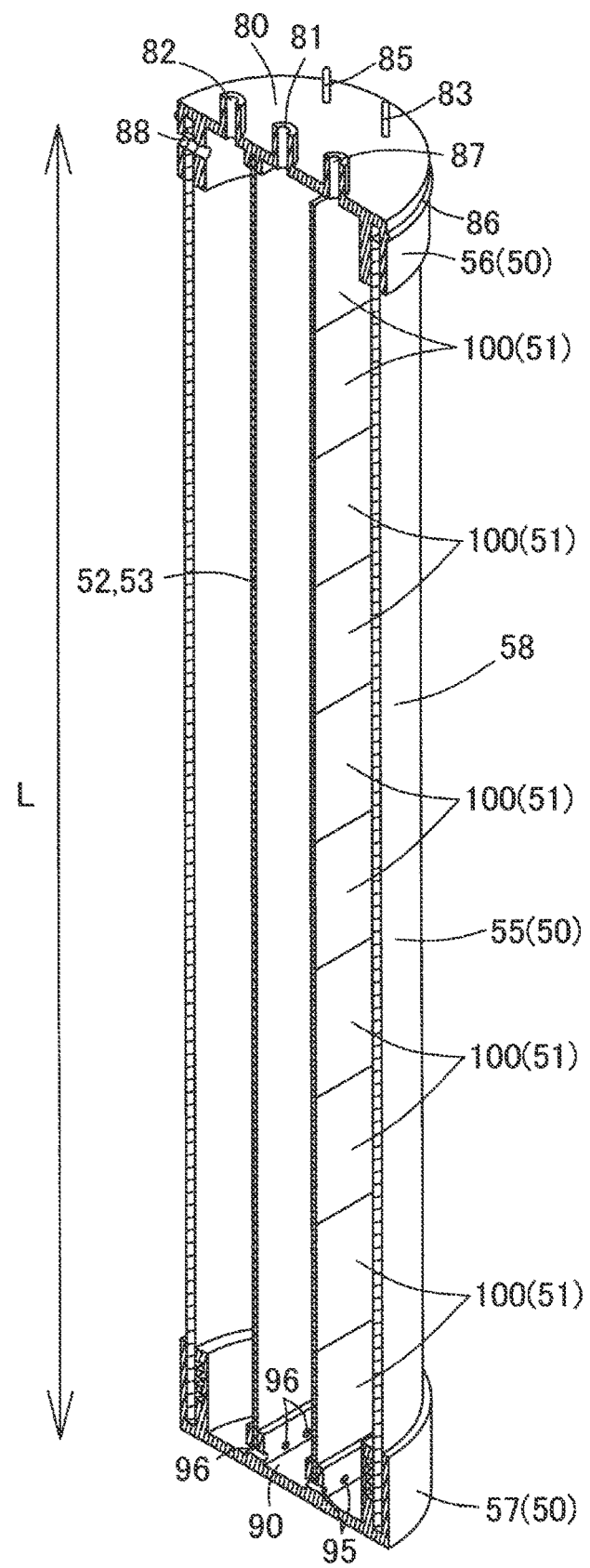
FIG. 6 is a cross-sectional perspective view of the photodecomposition cell in FIG. 5.
Figure 7:
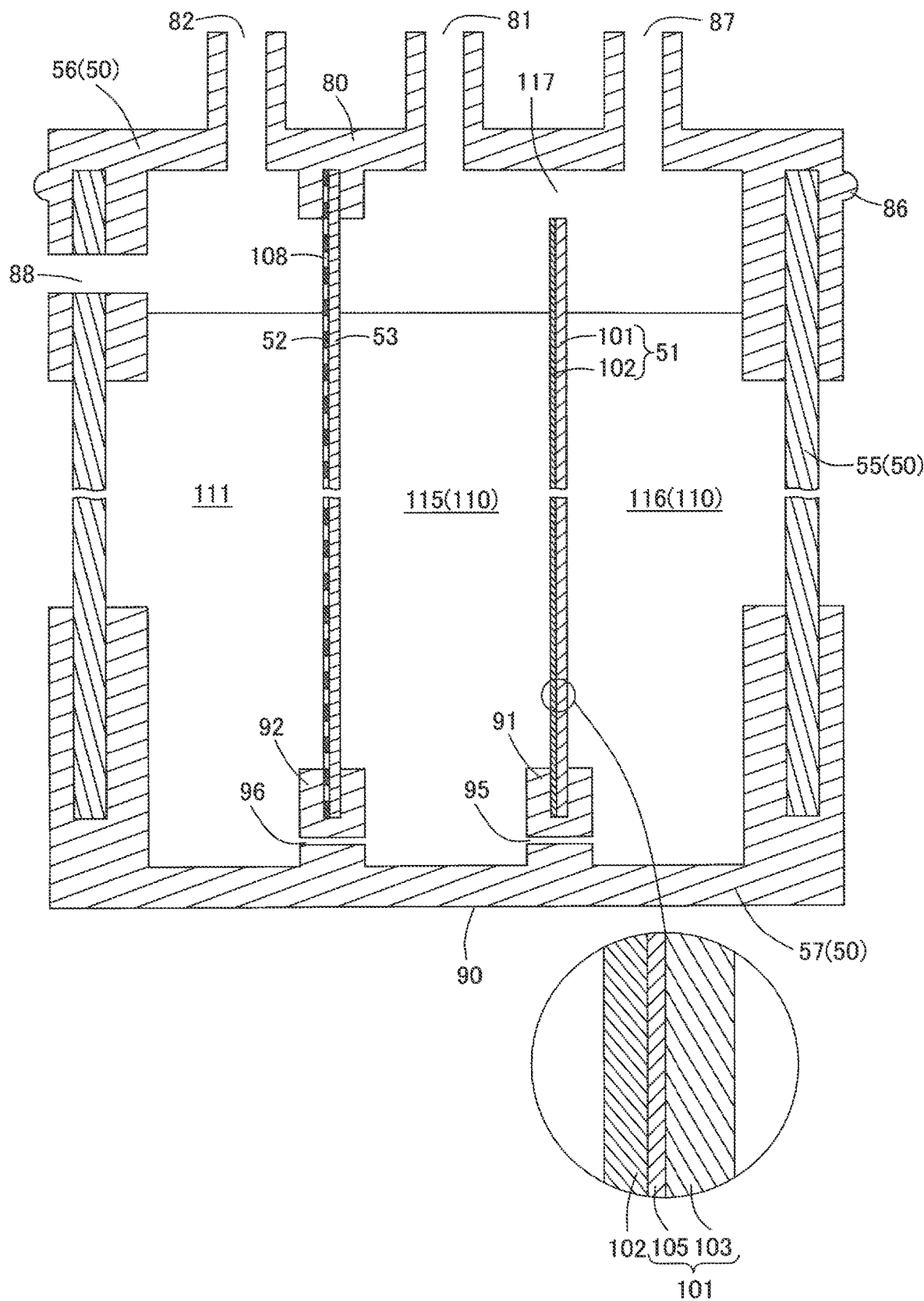
FIG. 7 is an end view of a longitudinal cross-section of the photodecomposition cell in FIG. 5.

As shown in FIGS. 6 and 7, the accommodating part 50 is a part that accommodates the anode electrode part 51, the cathode electrode part 52, and the ion exchanger 53.

As shown in FIGS. 5 and 6, the accommodating part 50 includes a cylinder 55 (light transmitter) extending in the axial direction L, an upper blockade member 56 that closes an upper end of the cylinder 55, and a lower blockade member 57 that closes a lower end of the cylinder 55, and includes a liquid discharge part 88 on a side surface.

Figure 10:
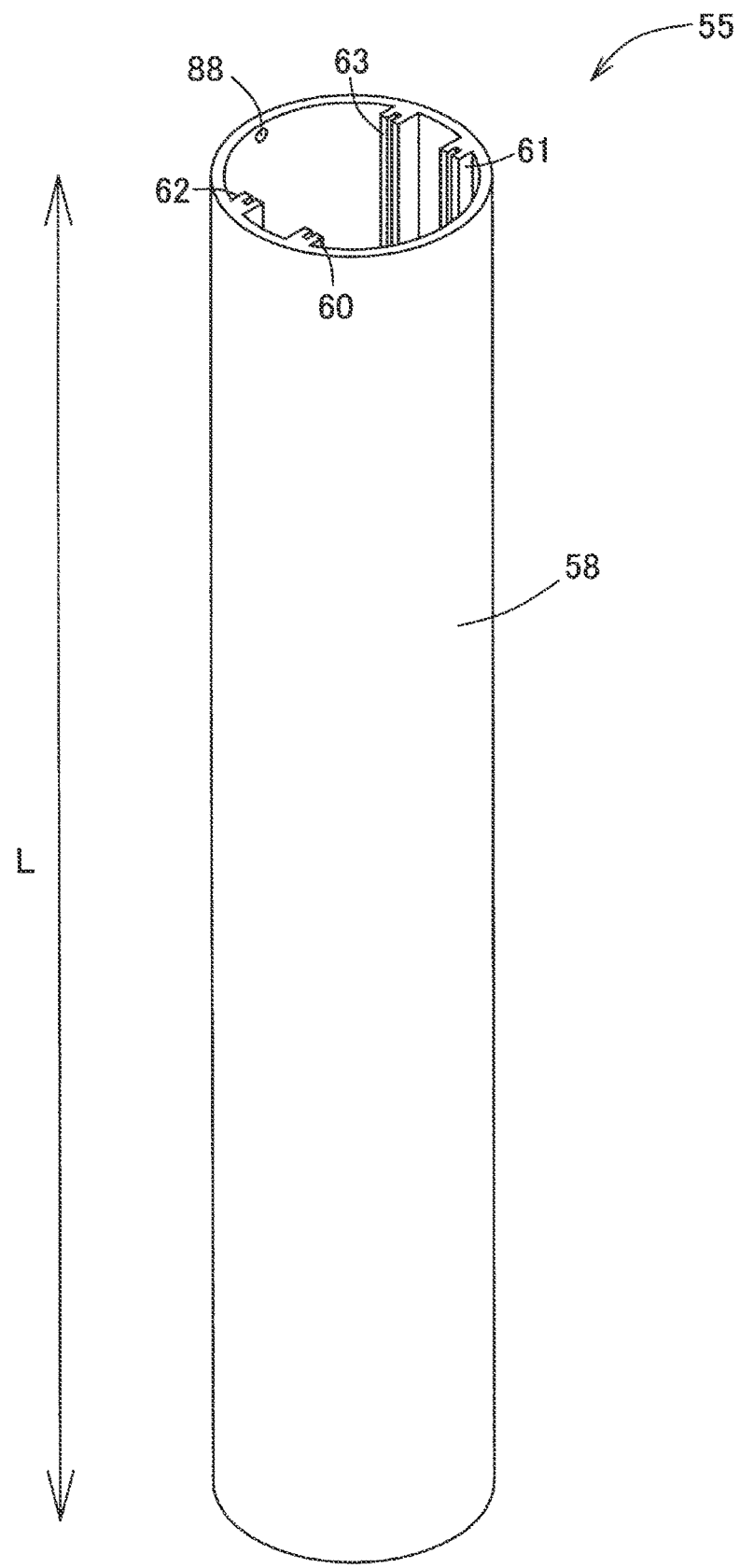
FIG. 10 is a perspective view of a cylinder in FIG. 5.

As shown in FIG. 10, the cylinder 55 is a cylindrical part whose internal space is opened in the axial direction L, has transparency, and allows light to be transmitted in a radial direction.

The cylinder 55 includes a body wall 58 and rails 60 to 63 on an inner surface of the body wall 58.

Figure 8:
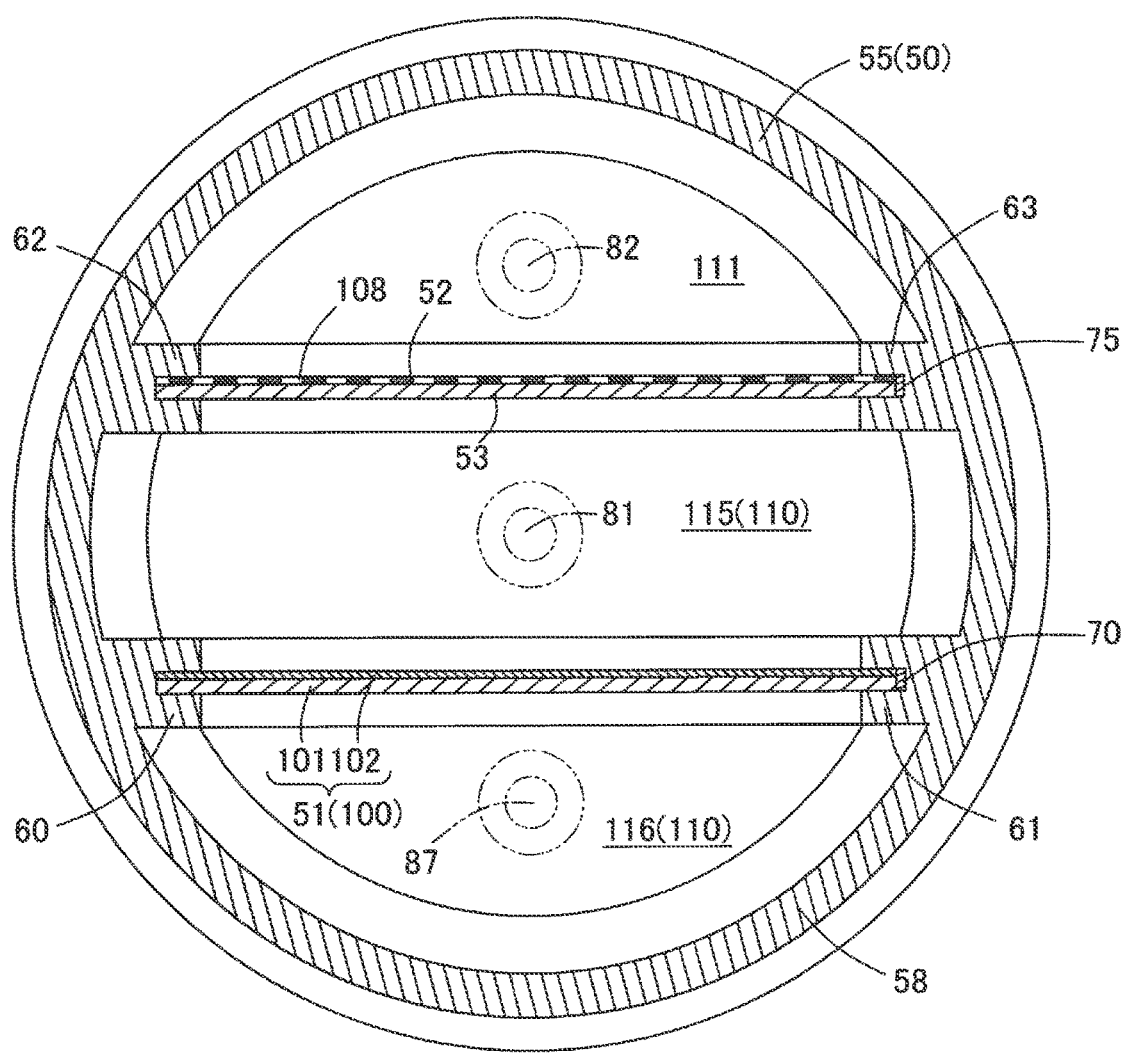
FIG. 8 is a transverse cross-sectional view of the photodecomposition cell in FIG. 5.

As shown in FIG. 8, the first rails 60 and 61 (holding recesses) are holding rails that hold the anode electrode part 51. Specifically, the first rails 60 and 61 include a pair of protruding strips (a pair of protrusions) extending in parallel to the axial direction L of the accommodating part 50, and are groove-shaped holding recesses having the body wall 58 or a connection wall with the body wall 58 as a bottom.

Figure 9:
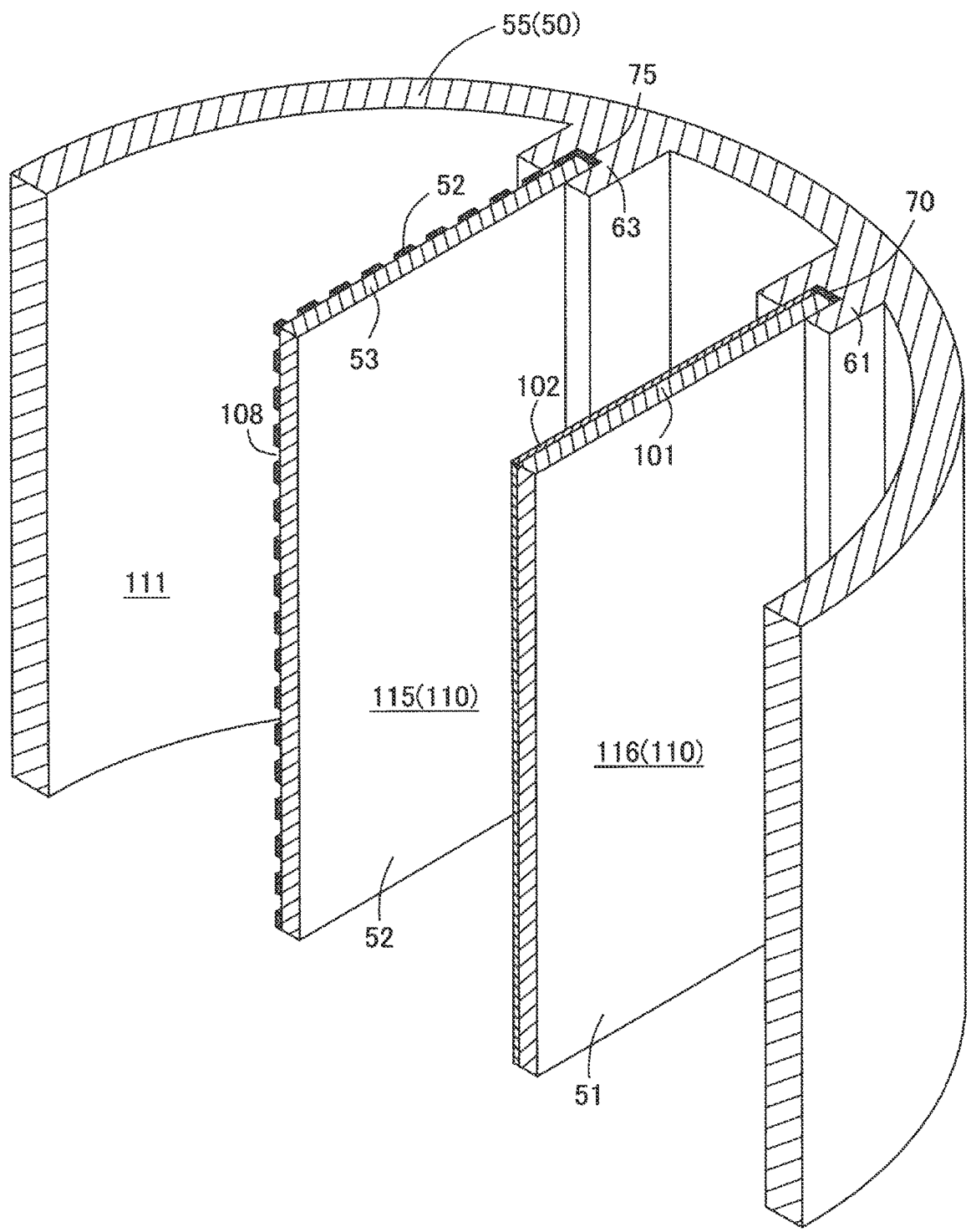
FIG. 9 is a cross-sectional perspective view of a main part of the photodecomposition cell in FIG. 5.

As illustrated in FIGS. 8 and 9, one rail 61 of the first rails 60 and 61 includes a first wiring member 70 (wiring line) at the bottom.

The first wiring member 70 is a wiring line that electrically connects the anode electrode part 51 and a first terminal 83 of the upper blockade member 56 to each other. Specifically, the first wiring member 70 is a conductive foil, and is a metal foil in the present embodiment.

As illustrated in FIG. 8, the second rails 62 and 63 are holding rails that hold the cathode electrode part 52 and the ion exchanger 53 therebetween. Specifically, similarly to the first rails 60 and 61, as shown in FIG. 10, the second rails 62 and 63 are a pair of protruding strips (a pair of protrusions) extending in parallel with the axial direction L of the accommodating part 50, and are groove-shaped holding recesses having the body wall 58 or a connection wall with the body wall 58 as a bottom.

As illustrated in FIGS. 8 and 9, one rail 63 of the second rails 62 and 63 includes a second wiring member 75 at the bottom.

The second wiring member 75 is a wiring line that electrically connects the cathode electrode part 52 and a second terminal 85 of the upper blockade member 56 to each other. Specifically, the second wiring member 75 is a conductive foil, and is a metal foil in the present embodiment.

As shown in FIG. 5, the upper blockade member 56 includes a body lid part 80, a first gas discharge part 81, a second gas discharge part 82, a first terminal 83, a second terminal 85, a cell-side engagement part 86, and a liquid supply part 87.

The body lid part 80 is a lid that closes the upper end of the cylinder 55 and closes the internal space of the cylinder 55.

The first gas discharge part 81 is a part that is provided at an upper end of the accommodating part 50 in the axial direction L and discharges the anode generating gas (oxygen gas, anode product) evolved in the anode electrode part 51 to the outside of the accommodating part 50.

The second gas discharge part 82 is a part that is provided at the upper end of the accommodating part 50 in the axial direction L and discharges the cathode generating gas (hydrogen gas, cathode product) evolved in the cathode electrode part 52 to the outside of the accommodating part 50.

The first terminal 83 is a terminal electrically connected to the first wiring member 70 and connected to the pipe structure 7.

The second terminal 85 is a terminal electrically connected to the second wiring member 75 and connected to the pipe structure 7.

The cell-side engagement part 86 is a protrusion protruding outward in the radial direction from the body lid part 80 and extends in a circumferential direction.

The liquid supply part 87 is a part that is connected to a liquid supply pipe 133 and supplies the decomposition liquid into the accommodating part 50.

As shown in FIG. 6, the lower blockade member 57 includes a body lid part 90.

The body lid part 90 is a lid that closes the lower end of the cylinder 55 and closes the internal space of the cylinder 55.

As shown in FIG. 7, the body lid part 90 includes an anode-side holder 91 holding a lower end of the anode electrode part 51 and a cathode-side holder 92 holding a lower end of the cathode electrode part 52.

The holders 91 and 92 are provided at positions lower than the electrode parts 51 and 52 to be held, and include one or a plurality of liquid level adjusting holes 95 and 96 that adjust a liquid level of the decomposition liquid.

The liquid level adjusting hole 96 is a liquid mixing hole for mixing the decomposition liquid in a space 110 and the decomposition liquid in a space 111, and is a pH adjusting hole for adjusting pH of the decomposition liquid.

As shown in FIG. 6, the anode electrode part 51 is formed by arranging a plurality of anode electrode pieces 100 in parallel and electrically connecting the anode electrode pieces 100 in parallel.

As shown in FIG. 7, each of the anode electrode pieces 100 is a photocatalytic electrode in which a photocatalyst 102 is supported on a transparent conductive substrate 101 (conductive substrate).

As shown in FIG. 7, a transparent conductive substrate 101 is a plate in which a transparent conductive layer 105 is stacked on at least one main surface of a transparent board 103, and allows light to be transmitted in a thickness direction.

The transparent board 103 is a light transmissive board having transparency and capable of passing light in the thickness direction, and for example, a transparent insulating board such as a glass substrate can be used.

The transparent conductive layer 105 is a layer having transparency and conductivity, and is a board through which light can pass in the thickness direction.

As the transparent conductive layer 105, for example, a transparent conductive oxide such as indium tin oxide (ITO), zinc oxide (ZnO), or fluorine-doped tin oxide (FTO) can be used.

As shown in FIG. 7, the cathode electrode part 52 is a conductive mesh, has a plurality of through holes 108 penetrating in the thickness direction, and allows gas to pass in the thickness direction.

As the cathode electrode part 52, for example, a metal having a smaller ionization tendency than water, such as platinum, gold, or silver, can be used. A base material plated with these metals can also be used. For example, titanium coated with platinum is used.

The cathode electrode part 52 allows part of light to be transmitted through the through hole 108.

The ion exchanger 53 is a film, and is a part that allows only specific ions to move in the thickness direction and restricts movement of remaining ions and electrons.

The ion exchanger 53 according to the present embodiment is a cation exchange film, restricts or disables movement of anions and electrons, and allows only cations to move. The ion exchanger 53 is also a blocking film that blocks a flow of gas in the thickness direction.

A material of the ion exchanger 53 is not limited as long as the generated cathode generating gas (hydrogen gas) or anode generating gas (oxygen gas) does not move (crossover) between the gas evolution spaces 110 and 111 to be described later. The ion exchanger 53 may include a porous film or glass frit.

As the ion exchanger 53, for example, a film of a perfluoroalkyl sulfonic acid-based polymer such as Nafion (registered trademark) can be used. Such films may be reinforced with polytetrafluoroethylene (PTFE) fibers such as Teflon (registered trademark).

As shown in FIG. 8, the ion exchanger 53 is located between the anode electrode part 51 and the cathode electrode part 52 in a state of overlapping with the cathode electrode part 52, and divides inside of the accommodating part 50 into the first gas evolution space 110 and the second gas evolution space 111. That is, the ion exchanger 53 blocks forward and backward movement of gas between the first gas evolution space 110 and the second gas evolution space 111.

The first gas evolution space 110 is a space to which the anode electrode part 51 belongs, and is a space where oxygen gas is evolved in the present embodiment.

The second gas evolution space 111 is a space to which the cathode electrode part 52 belongs, and is a space in which hydrogen gas is evolved in the present embodiment.

The liquid discharge part 88 is a part that is connected to a liquid discharge pipe (not shown) and keeps the liquid level of the decomposition liquid at a certain level or less. That is, in each photodecomposition cell 6, when the liquid level of the decomposition liquid reaches the liquid discharge part 88, the decomposition liquid is discharged from the liquid discharge part 88 to the outside.

Here, a positional relationship of each part of the photodecomposition cell 6 will be described.

As shown in FIG. 8, in the anode electrode part 51, both ends in the radial direction of the accommodating part 50 are inserted into and supported by the first rails 60 and 61. The anode electrode part 51 and the first rails 60 and 61 are sealed with a sealing member (not shown). Note that a sealing member may be provided across a boundary between the anode electrode part 51 and the first rails 60 and 61.

In each anode electrode piece 100 of the anode electrode part 51, the transparent conductive layer 105 is in contact with the first wiring member 70 in the first rail 61, and is electrically connected to each other via the first wiring member 70. Further, each anode electrode piece 100 of the anode electrode part 51 is electrically connected to the first terminal 83 via the first wiring member 70.

As shown in FIG. 7, an upper end of the anode electrode part 51 in the axial direction L is separated downward from the upper blockade member part 56. That is, the first gas evolution space 110 is divided into two spaces 115 and 116 by the anode electrode part 51, and the two spaces 115 and 116 communicate with each other via a communicating part 117.

The spaces 115 and 116 communicate with each other also through the liquid level adjusting hole 95, and the decomposition liquid belonging to the spaces 115 and 116 can alternately move back and forth through the liquid level adjusting hole 95. Therefore, the liquid levels of the decomposition liquids belonging to the space 115 and 116 are substantially equal.

As shown in FIG. 8, the cathode electrode part 52 and the ion exchanger 53 overlap with each other in the thickness direction, and both ends in the radial direction of the accommodating part 50 are inserted into and supported by the second rails 62 and 63. The cathode electrode part 52 and the ion exchanger 53, and the second rails 62 and 63 are sealed with a sealing member (not illustrated). Note that the sealing member may be provided across a boundary between the cathode electrode part 52 and the ion exchanger 53, and the second rails 62 and 63.

The cathode electrode part 52 is in contact with the second wiring member 75 in the second rail 63 and is electrically connected to the second terminal 85 via the second wiring member 75.

The ion exchanger 53 is located on a side of the anode electrode part 51 with respect to the cathode electrode part 52.

As shown in FIGS. 2 and 7, the first gas discharge part 81 makes the first gas evolution space 110 communicate with an external space, and the second gas discharge part 82 makes the second gas evolution space 111 communicate with the external space.

That is, the photodecomposition cell 6 can discharge the anode evolving gas (oxygen gas) generated in the first gas evolution space 110 to the outside from the first gas discharge part 81, and can discharge the cathode generating gas (hydrogen gas) generated in the second gas evolution space 111 to the outside from the second gas discharge part 82.

Figure 11:
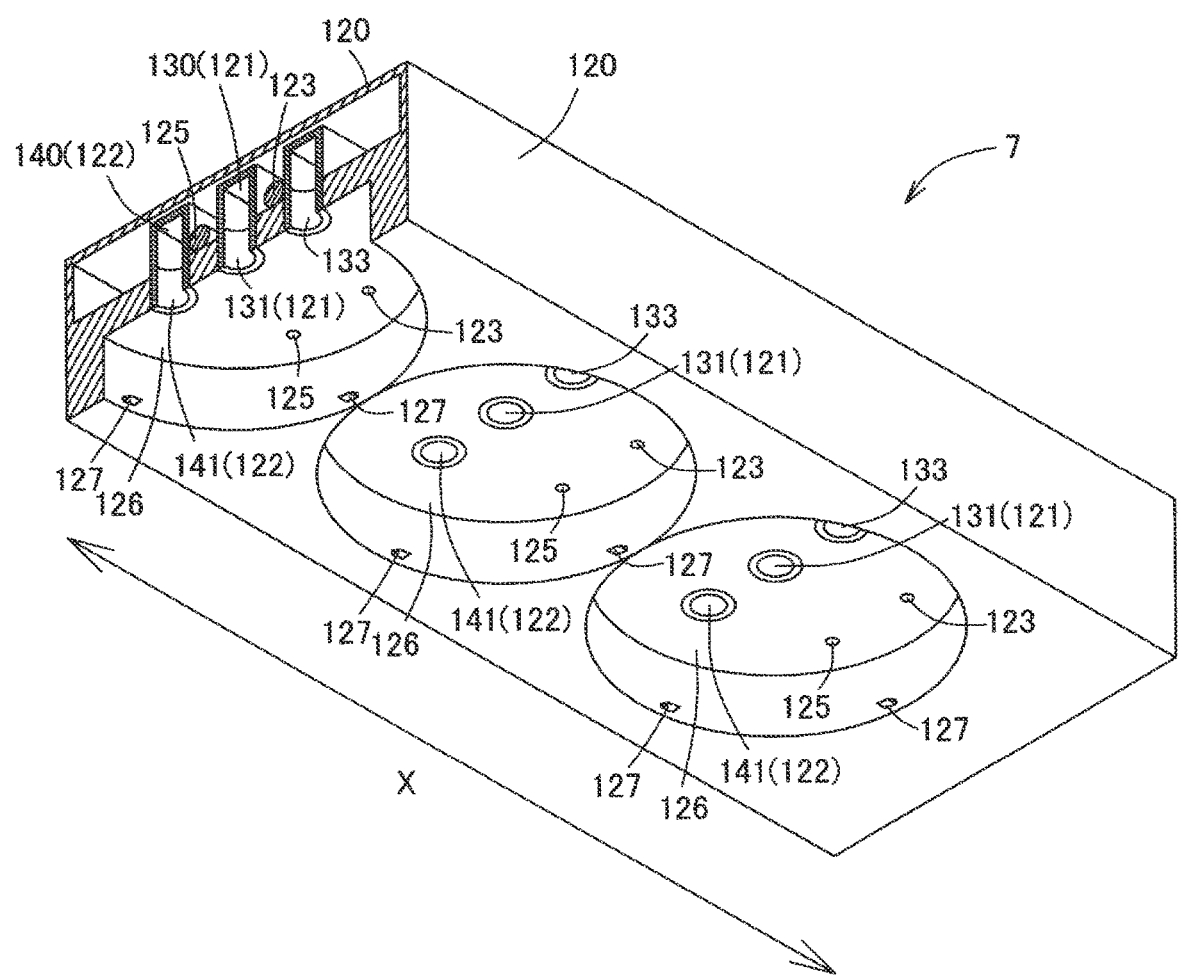
FIG. 11 is a cross-sectional perspective view of a pipe structure diagram in FIG. 5.

As shown in FIG. 11, the pipe structure 7 includes a first pipe 121, a second pipe 122, a first wiring line 123, a second wiring line 125, and a liquid supply pipe 133 in a casing part 120, and a mounting part 126 is provided on a lower surface of the casing part 120.

Figure 12A:
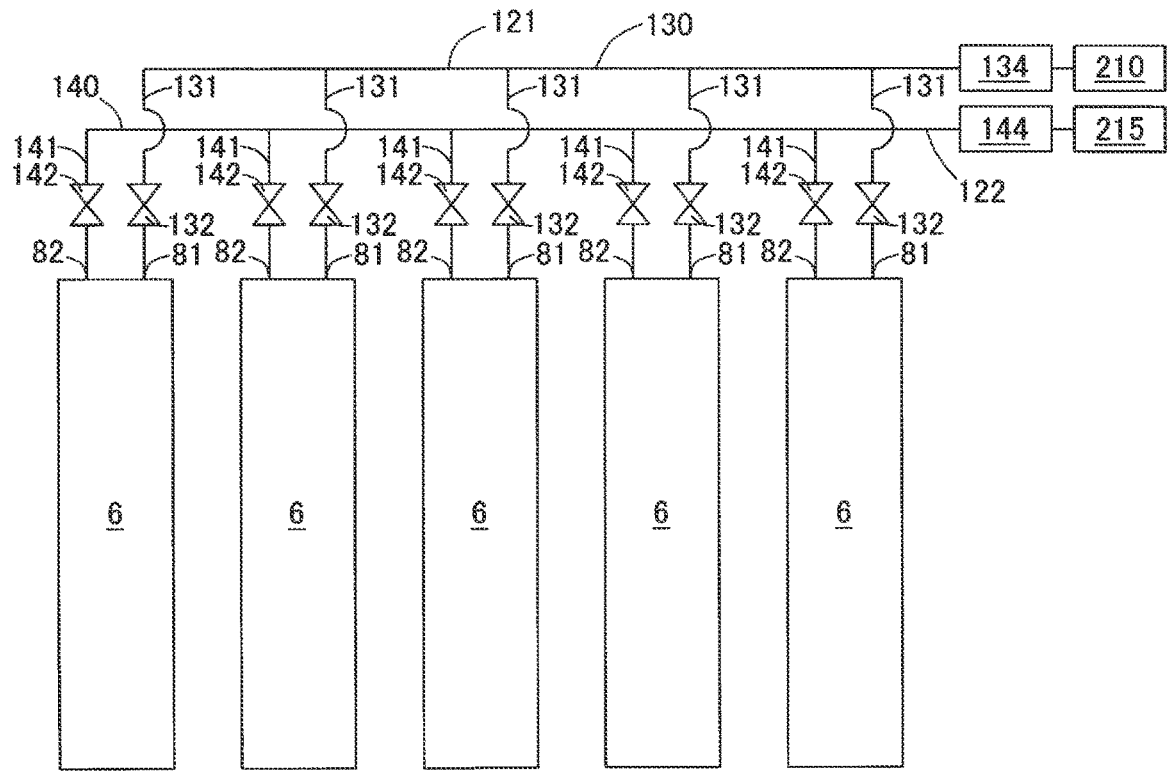

The first pipe 121 is a pipe through which the anode generating gas (oxygen gas) flows, and as shown in FIGS. 11 and 12A, includes a base pipe 130 and a branch pipe 131 branched from the base pipe 130, and a decompressor 134 is connected to a middle or an end.

The base pipe 130 is a pipe connected to an external anode-side recovery part 210 or an external gas storage device.

The branch pipe 131 is an introduction pipe that communicates with the base pipe 130 and guides the gas discharged from the first gas discharge part 81 of each photodecomposition cell 6 to the base pipe 130, and is a connection pipe that connects the first gas discharge part 81 and the base pipe 130 to each other.

As shown in FIG. 12A, the branch pipe 131 includes a valve 132 at an intermediate part in a gas flow direction, and a gas flow can be adjusted by opening and closing the valve 132. That is, the branch pipe 131 allows the gas to flow by opening the valve 132, and can block the gas flow by closing the valve 132.

The decompressor 134 is a member that decompresses the inside of the accommodating part 50 of each photodecomposition cell 6 via the first pipe 121.

As the decompressor 134, for example, a diaphragm pump or the like can be used. The decompressor 134 may be driven by an auxiliary power supply, or may be driven by separately providing a power supply.

The decompressor 134 according to the present embodiment also serves as a gas transfer unit that transfers the gas from each photodecomposition cell 6.

The second pipe 122 is a pipe through which the cathode generating gas (hydrogen gas) flows, and as shown in FIGS. 11 and 12A, includes a base pipe 140 and a branch pipe 141 branched from the base pipe 140, and a decompressor 144 is connected to a middle or an end.

The base pipe 140 is a pipe connected to an external cathode-side recovery part 215.

The branch pipe 141 is a connection pipe that connects the second gas discharge part 82 of each photodecomposition cell 6 and the base pipe 140 to each other.

As shown in FIG. 12A, the branch pipe 141 includes a valve 142 at an intermediate part in a gas flow direction, and a gas flow can be adjusted by opening and closing the valve 142. That is, the branch pipe 141 allows the gas to flow by opening the valve 142, and can block the gas flow by closing the valve 142.

The decompressor 144 is a member that decompresses the inside of the accommodating part 50 of each photodecomposition cell 6 via the second pipe 122.

As the decompressor 144, for example, a diaphragm pump or the like can be used. The decompressor 144 may be driven by an auxiliary power supply, or may be driven by separately providing a power supply.

The decompressor 144 according to the present embodiment also serves as a gas transfer unit that transfers the gas from each photodecomposition cell 6.

Figure 12B:
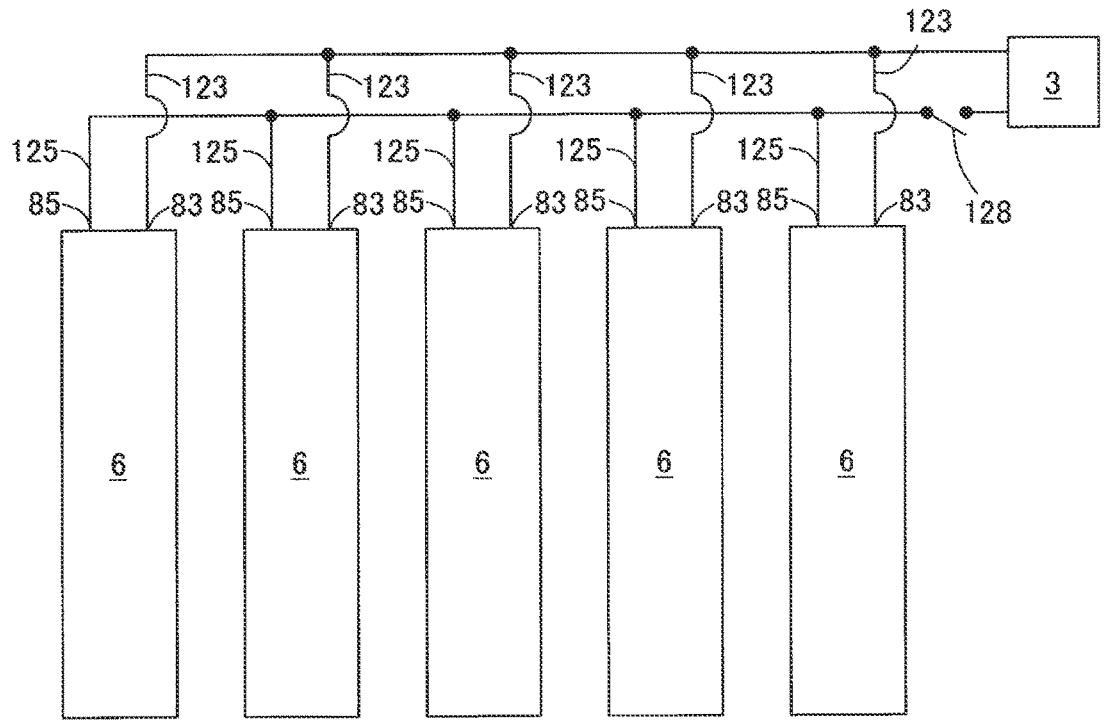

As shown in FIG. 12B, the first wiring line 123 is a wiring line that electrically connects the auxiliary power supply device 3 and the first terminal 83 of each photodecomposition cell 6 to each other.

The second wiring line 125 is a wiring line that electrically connects the auxiliary power supply device 3 and the second terminal 85 of each photodecomposition cell 6 to each other.

At least one wiring line 125 of the first wiring line 123 or the second wiring line 125 is provided with a switch 128, and the photodecomposition module 2 and the auxiliary power supply device 3 can be electrically connected and disconnected by turning on and off the switch 128.

Further, a power converter (for example, a DC/DC converter) that optimizes current-voltage characteristics of the auxiliary power supply device 3 and converts the current-voltage characteristics into current-voltage characteristics required by the photodecomposition cells 6 may be appropriately inserted between the auxiliary power supply device 3 and the photodecomposition cells 6. This can improve energy transmission efficiency.

The liquid supply pipe 133 is a pipe for supplying a decomposition liquid to the photodecomposition cells 6 from the outside.

The mounting part 126 is a part to which each photodecomposition cell 6 is attached, and is a recess recessed upward from the lower surface of the casing part 120 as shown in FIG. 11.

The mounting part 126 includes one or a plurality of attachment-side engagement parts 127.

The attachment-side engagement part 127 is a part engageable with the cell-side engagement part 86 of each photodecomposition cell 6, and is urged toward a center of the mounting part 126 by an urging member (not illustrated).

The auxiliary power supply device 3 is an auxiliary power supply that applies a voltage to the photodecomposition module 2 and assists the decomposition of the decomposition liquid (water) in the photodecomposition module 2. The auxiliary power supply device 3 according to the present embodiment is a photoelectric converter that converts light energy into electric energy, and is specifically a solar cell module.

The anode collector 201 collects the anode generating gas (oxygen gas) discharged from the first gas discharge part 81 of the photodecomposition module 2.

As shown in FIG. 2, the anode collector 201 includes an anode-side recovery part 210, an oxidant gas generator 211, and an anode-side adjuster 212, and is capable of generating oxidant gas from anode generating gas and discharging the oxidant gas to the booth 203.

The anode-side recovery part 210 is a part that recovers the anode generating gas from the first gas discharge part 81.

The oxidant gas generator 211 is a part that oxidizes the anode generating gas to generate oxidant gas. For example, in a case where the anode generating gas is oxygen gas, the oxidant gas generator 211 can be configured by an ozone generator that generates ozone gas from oxygen gas, such as an ozonizer.

The anode-side adjuster 212 is a part that adjusts a supply amount of oxidant gas to the booth 203.

The anode-side adjuster 212 according to the present embodiment monitors each photodecomposition cell 6 of the photodecomposition module 2 (not illustrated), and is capable of adjusting a supply amount of the oxidant gas in accordance with a predicted deterioration state of each photodecomposition cell 6 of the photodecomposition module 2 in conjunction with a deterioration prediction device (deterioration prediction unit) that predicts the deterioration state of each photodecomposition cell 6.

The cathode collector 202 collects the cathode generating gas (hydrogen gas) discharged from the second gas discharge part 82 of the photodecomposition module 2.

As shown in FIG. 2, the cathode collector 202 includes the cathode-side recovery part 215, a liquid remover 216, and a cathode-side adjuster 217, and can perform deliquoring of the cathode generating gas and discharge the cathode generating gas to the cathode-side storage 205.

The cathode-side recovery part 215 is a part that recovers the cathode generating gas from the second gas discharge part 82.

The liquid remover 216 is a part that removes (dehydrates) the decomposition liquid from the cathode generating gas.

The cathode-side adjuster 217 is a part that adjusts a supply amount of the cathode generating gas to the cathode-side storage 205.

The cathode-side adjuster 217 according to the present embodiment monitors each photodecomposition cell 6 of the photodecomposition module 2 (not illustrated), and is capable of adjusting a supply amount of the cathode generating gas in accordance with the predicted deterioration state of each photodecomposition cell 6 of the photodecomposition module 2 in conjunction with the deterioration prediction device (deterioration prediction unit) that predicts the deterioration state of each photodecomposition cell 6.

The booth 203 is a box capable of accommodating the object 180 to be disinfected such as clothes, shoes, medical instruments, hairdressing tools, and appliances for handling food.

Figure 13A:
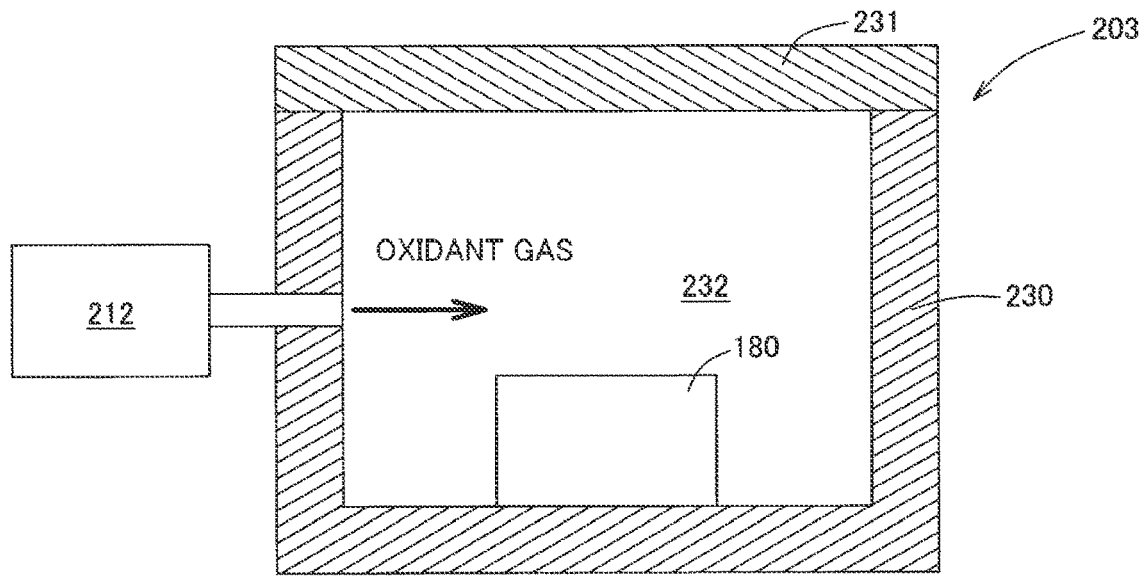
Figure 13B:
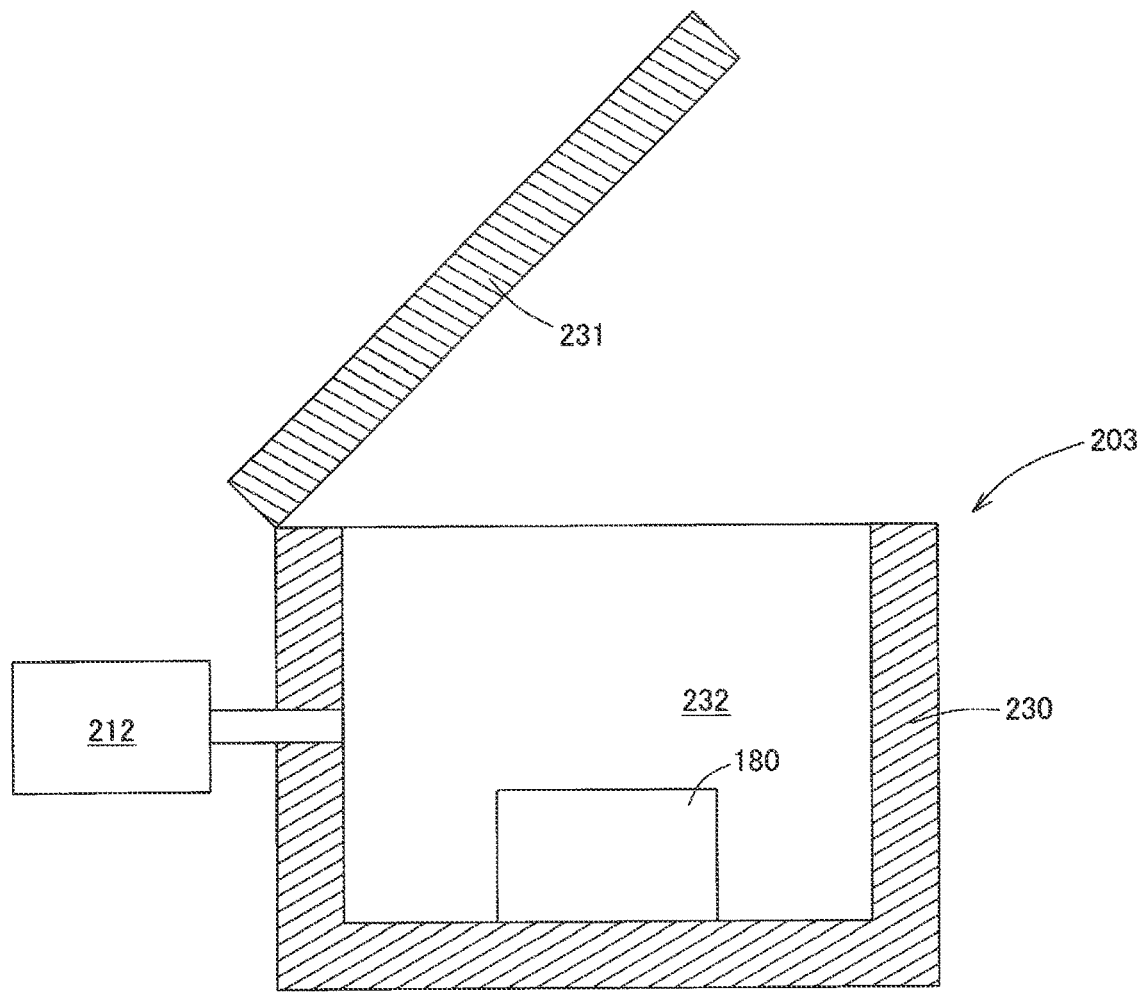

As shown in FIGS. 13A and 13B, the booth 203 includes a casing part 230 and a blockade member 231, and an internal space 232 of the casing part 230 can be opened and closed by the blockade member 231.

That is, the booth 203 can be changed to a closed posture in which the internal space 232 of the casing part 230 is closed by the blockade member 231 as illustrated in FIG. 13A, and an open posture in which the blockade member 231 is opened and the internal space 232 of the casing part 230 communicates with the external space as illustrated in FIG. 13B.

The cathode-side storage 205 is a part that stores hydrogen gas as cathode generating gas, and for example, a hydrogen tank such as a hydrogen storing alloy canister can be used.

Next, a positional relationship of each part of the photodecomposition module 2 will be described.

As illustrated in FIGS. 1 and 3, the photodecomposition module 2 is installed in an inclined posture in which the axial direction L of each photodecomposition cell 6 intersects a horizontal plane by a frame.

As shown in FIG. 3, each of the photodecomposition cells 6 is in a longitudinal posture in which the axial direction L extends in the longitudinal direction Y of the photodecomposition module 2. The photodecomposition cells 6 are arranged side by side in the lateral direction X, and have central axes parallel to each other.

The posture holder 5 holds the photodecomposition cells 6. Specifically, as shown in FIG. 4, the photodecomposition cell 6 is sandwiched between the first recess 20 of the first holder 10 and the second recess 30 of the second holder 11, and an end of the photodecomposition cell 6 is inserted into the mounting part 126 of the pipe structure 7. The cell-side engagement part 86 of the photodecomposition cell 6 is engaged with the attachment-side engagement part 127 of the pipe structure 7 in the axial direction L.

Figure 14:
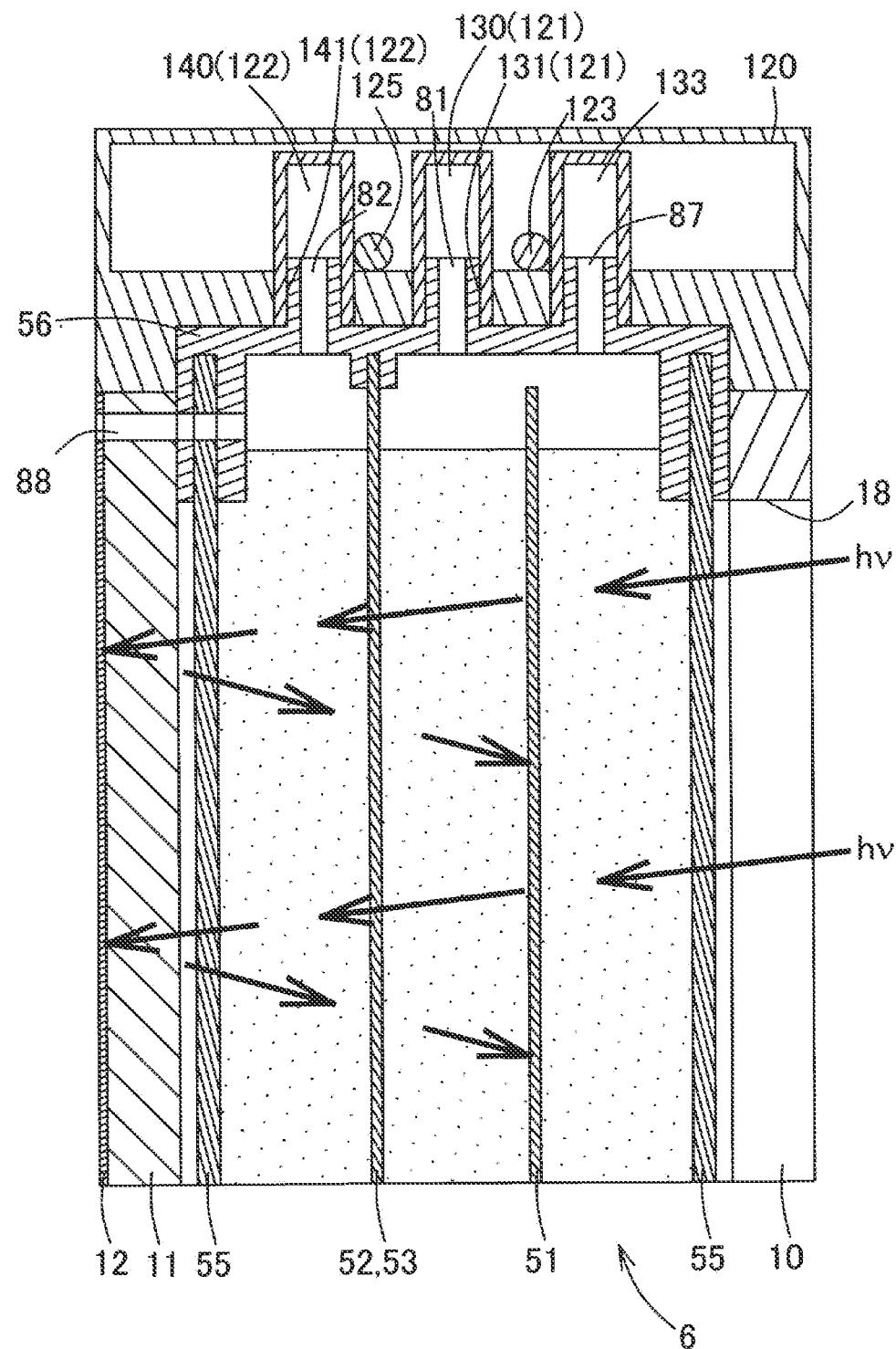
FIG. 14 is a longitudinal cross-sectional view of the photodecomposition module in FIG. 3, and main light flows are represented by arrows.

As shown in FIG. 14, the first gas discharge part 81 is connected to the branch pipe 131 of the first pipe 121, and the second gas discharge part 82 is connected to the branch pipe 141 of the second pipe 122.

The first terminal 83 is connected to the first wiring line 123, and the second terminal 85 is connected to the second wiring line 125.

Next, an operation when hydrogen gas is produced by the hydrogen production device 1 will be described.

First, water is introduced as a decomposition liquid into the accommodating part 50 of each photodecomposition cell 6.

Then, when the switch 128 is turned on to electrically connect the photodecomposition module 2 and the auxiliary power supply device 3 to each other, and the photodecomposition module 2 and the solar cell module of the auxiliary power supply device 3 are irradiated with light in that state, a potential is generated between the anode electrode part 51 and the cathode electrode part 52, and water is decomposed into hydrogen gas (cathode generating gas) and oxygen gas (anode generating gas) by a voltage generated in the solar cell module.

Figure 15:
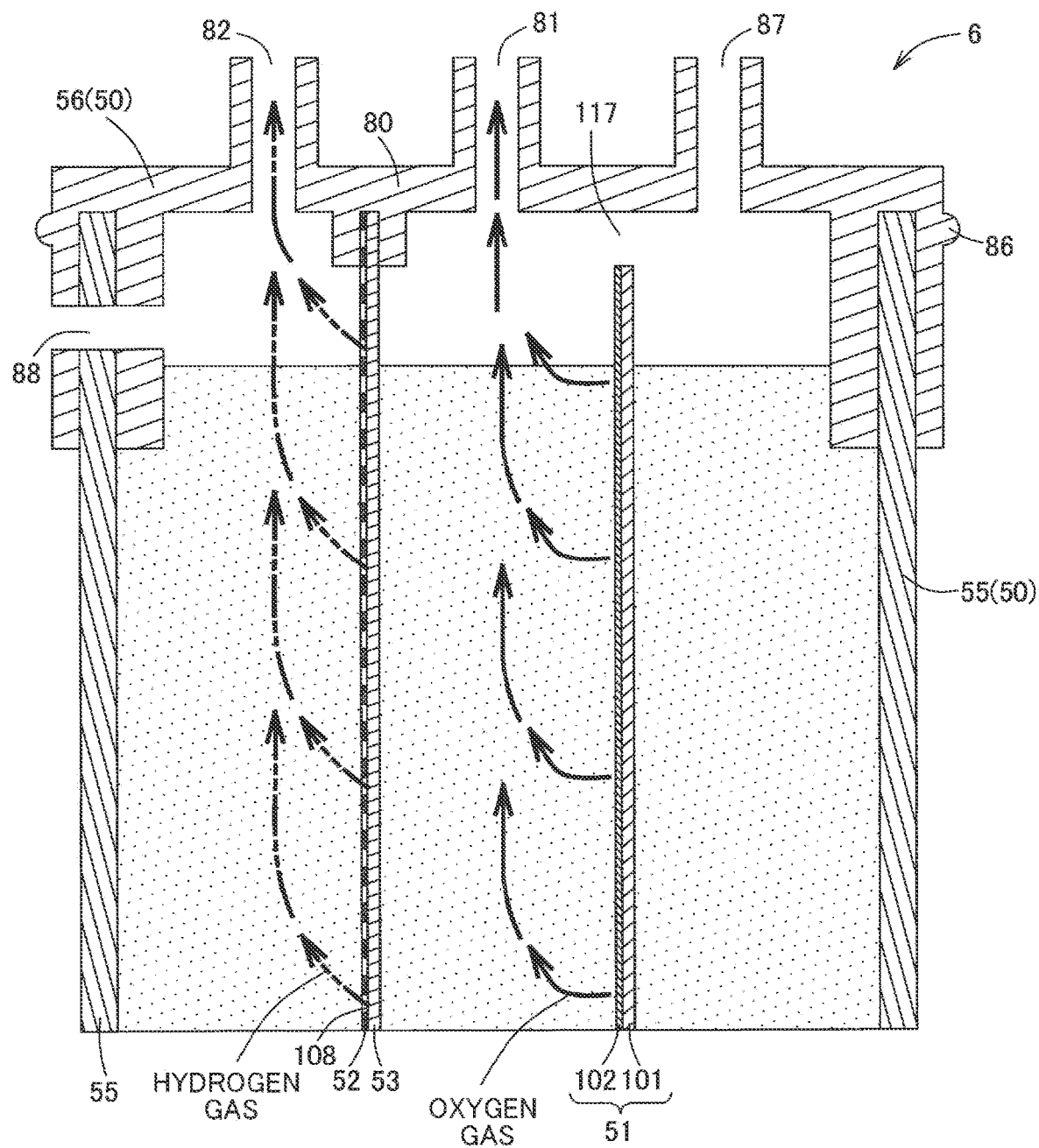
FIG. 15 is an end view of a longitudinal cross-section of the photodecomposition cell in FIG. 4, and gas flows are represented by arrows.

Specifically, as shown in FIG. 15, water as a decomposition liquid is oxidized by holes generated by photoexcitation in the photocatalyst 102 of the anode electrode part 51 around the anode electrode part 51 to generate oxygen gas and protons (W), and protons (W) having passed through the ion exchanger 53 in the cathode electrode part 52 receive electrons and reduce water around the cathode electrode part 52 to generate hydrogen gas.

Since the movement of the generated oxygen gas toward the cathode electrode part 52 is restricted by the ion exchanger 53, the generated oxygen gas is discharged to the outside from the first gas discharge part 81 above via the communicating part 117. On the other hand, since the movement of the hydrogen gas toward the anode electrode part 51 is restricted by the ion exchanger 53, the hydrogen gas passes through the cathode electrode part 52 and is discharged to the outside from the second gas discharge part 82.

Next, an optical path in a case where the photodecomposition module 2 is irradiated with light from the first holder 10 will be described.

When the light enters from the first holder 10, the light passes through the first holder 10 and reaches the photodecomposition cell 6 as shown in FIG. 14. Part of the light is absorbed by the photodecomposition cell 6, and the light passing through the photodecomposition cell 6 passes through the second holder 11 and is reflected by the reflector 12. Part of the reflected light reflected by the reflector 12 passes through the second holder 11 again and is absorbed by the photodecomposition cell 6.

As described above, in the photodecomposition module 2 according to the present embodiment, part of light that has once passed through the photodecomposition cell 6 is also absorbed by the photodecomposition cell 6 as reflected light by the reflector 12, and thus hydrogen gas can be generated more effectively.

Next, a case of disinfecting the object 180 to be disinfected using the hydrogen production device 1 according to the present embodiment will be described.

As shown in FIG. 13, first, the blockade member 231 is opened, the booth 203 is brought into the open posture, the object 180 to be disinfected is disposed in the internal space 232, and the blockade member 231 is closed to bring the booth 203 into the closed posture.

Then, the oxidant gas generator 211 generates the oxidant gas using the anode generating gas, and the oxidant gas is supplied from the anode-side adjuster 212 to the booth 203.

At this time, the anode-side adjuster 212 adjusts the supply amount of the oxidant gas on the basis of the deterioration state predicted by the deterioration prediction device. The anode-side adjuster 212 may adjust the supply amount of the oxidant gas in accordance with a purpose of use.

When a predetermined time has elapsed after the oxidant gas fills the inside of the booth 203, the blockade member 231 is opened, the booth 203 is brought into the open posture, and the object 180 to be disinfected is taken out from the booth 203.

Next, a case will be described where hydrogen gas is replenished to the cathode-side storage 205 using the hydrogen production device 1 according to the present embodiment.

First, the cathode-side storage 205 is connected to the cathode-side adjuster 217, the deliquoring of hydrogen gas is performed in the liquid remover 216, and the deliquoring-performed hydrogen gas is supplied from the cathode-ide adjuster 217 to the cathode-side storage 205.

At this time, the cathode-side adjuster 217 adjusts the supply amount of hydrogen gas on the basis of the deterioration state predicted by the deterioration prediction device. The cathode-side adjuster 217 may adjust the supply amount of the hydrogen gas in accordance with the purpose of use.

When the cathode-side storage 205 is filled with a predetermined amount of hydrogen gas, the cathode-side storage 205 is replaced with a new cathode-side storage as necessary.

In the photodecomposition module 2 according to the present embodiment, the anode electrode part 51 and the cathode electrode part 52 are accommodated in the accommodating part 50 having a cylindrical shape, and a voltage difference is generated between the anode electrode part 51 and the cathode electrode part 52. Thus, water as a decomposition liquid is decomposed in the accommodating part 50. That is, since the accommodating part 50 having a cylindrical shape is used, the side surface of the accommodating part 50 can be formed without providing a joint between members, a sealing property is good, strength is high, and durability is excellent. In addition, since a structure of each photodecomposition cell 6 is a tubular shape, it is possible to improve the strength of each photodecomposition cell 6 and simplify an ancillary member such as a sealing part.

In the photodecomposition module 2 according to the present embodiment, it is easy to increase a size of the module by integrating the photodecomposition cells 6 having a detachable cylindrical cell structure.

In the photodecomposition module 2 according to the present exemplary embodiment, the anode electrode part 51 is configured such that the plurality of anode electrode pieces 100 are arranged side by side in the axial direction L and are electrically connected to each other, and thus a reaction area in the photocatalyst 102 can be increased.

In the photodecomposition module 2 according to the present embodiment, since each of the photodecomposition cells 6 is independently attachable to and detachable from the posture holder 5, the photodecomposition cell 6 that has failed due to an initial failure or the like or the photodecomposition cell 6 that has reached an end of a product life can be individually replaced with a new photodecomposition cell 6. That is, when the photocatalyst 102 is deteriorated, the photodecomposition cell 6 can be replaced as consumables.

In the photodecomposition module 2 according to the present embodiment, the photodecomposition cells 6 are electrically connected in parallel to the auxiliary power supply device 3, and the valves 132 and 142 are further provided at intermediate parts of the branch pipe 131 and 141, respectively, in the gas flow direction. Therefore, even when one photodecomposition cell 6 fails, the one photodecomposition cell 6 can be replaced while another photodecomposition cell 6 is driven.

In the photodecomposition cell 6 according to the present embodiment, the anode electrode part 51 is located between the first holder 10 and the reflector 12, and the photocatalyst 102 of the transparent conductive substrate 101 faces the reflector 12. Therefore, part of the light passing through the photodecomposition cell 6 is reflected by the reflector 12, returns to the photodecomposition cell 6 again, and can be absorbed by the photocatalyst 102, and thus a water decomposition reaction is further promoted as compared with a case where the reflector 12 is not provided.

In the photodecomposition module 2 according to the present embodiment, the first gas evolution space 110 and the second gas evolution space 111 are divided by the ion exchanger 53, and the gas discharge parts 81 and 82 are provided corresponding to the gas evolution spaces 110 and 111, respectively. Therefore, the hydrogen gas and the oxygen gas can be taken out to the outside without being mixed, which is safer. In addition, the hydrogen gas as cathode generating gas and the oxygen gas as anode generating gas are easily discharged, and the gas is less likely to remain on the cathode electrode part 52 or the photocatalyst 102.

In the photodecomposition module 2 according to the present embodiment, since both ends of the anode electrode part 51 are held by the rails 60 and 61 extending all over the accommodating part 50 in the axial direction L of the accommodating part 50, the anode electrode part 51 can be stably held. Similarly, in the photodecomposition module 2 according to the present embodiment, both ends of the cathode electrode part 52 and the ion exchanger 53 are held by the rails 62 and 63 extending all over the accommodating part 50 in the axial direction L of the accommodating part 50. Therefore, the cathode electrode part 52 and the ion exchanger 53 can be stably held.

In the photodecomposition module 2 according to the present embodiment, the first wiring member 70 is provided at the bottom of the rail 61, and is disposed between the bottom of the rail 61 and each anode electrode piece 100. Therefore, the first wiring member 70 can be prevented from being exposed to water as a decomposition liquid, which is safer.

Similarly, the second wiring member 75 is provided at the bottom of the rail 63, and is disposed between the bottom of the rail 63 and each cathode electrode part 52 and the ion exchanger 53. Therefore, the second wiring member 75 can be prevented from being exposed to water as a decomposition liquid, which is safer.

In the hydrogen production device 1 according to the present embodiment, since the photodecomposition module 2 is fixed in a posture inclined with respect to the horizontal plane by the frame, the sunlight can be received for a longer time, and water can be decomposed more effectively by the photodecomposition module 2.

In the photodecomposition module 2 according to the present embodiment, the anode electrode part 51 mainly receives light from the transparent conductive substrate 101. That is, since a surface different from the surface generating the gas (a surface of the photocatalyst 102) is irradiated with light, scattering of light due to the generated gas can be avoided, and photolysis efficiency can be improved.

In the photodecomposition module 2 according to the present embodiment, the liquid discharge part 88 is disposed at a position lower than the gas discharge parts 81 and 82 (closer to the lower blockade member 57). Therefore, the decomposition liquid remains at a liquid level below the liquid discharge part 88, and it is possible to prevent the decomposition liquid from overflowing to the outside through the gas discharge parts 81 and 82.

In the hydrogen production device 1 according to the present embodiment, the decompressors 134 and 144 are driven to control the inside of the accommodating part 50 of the photodecomposition cell 6 to be depressurized from the gas discharge parts 81 and 82. Thus, bubbles of hydrogen gas and oxygen gas evolved on surfaces of the electrode parts 51 and 52 can be easily removed, and the hydrogen gas and the oxygen gas can be effectively taken out from the photodecomposition cell 6.

In the hydrogen production device 1 according to the present embodiment, since the accommodating part 50 of the photodecomposition cell 6 has a cylindrical shape and high strength, even when the inside of the accommodating part 50 is depressurized by the decompressors 134 and 144, the accommodating part 50 is hardly deformed, and is highly reliable.

In the hydrogen production device 1 according to the present embodiment, since the cathode-side storage 205 storing hydrogen gas is attachable to and detachable from the cathode collector 202, the cathode-side storage 205 is portable, and the stored hydrogen gas can be used as fuel gas for a portable fuel cell or the like.

In the hydrogen production device 1 according to the present embodiment, the hydrogen gas and the oxidant gas can be simultaneously generated, and the supply amounts of the hydrogen gas and the oxidant gas can be adjusted in accordance with the purpose of use. That is, since the hydrogen gas can be used as a fuel of a power generator such as a fuel cell, and the oxidant gas can be used for disinfection, it is possible to sustain living at or above a certain level at a shelter or the like.

In the above embodiment, the case where water is used as the decomposition liquid has been described, but the present invention is not limited thereto. As the decomposition liquid, a different type of decomposition liquid may be used as long as the decomposition liquid contains a hydrogen element and generates hydrogen gas during decomposition.

For example, by using a chloride aqueous solution such as a sodium chloride aqueous solution or a potassium chloride aqueous solution or seawater as the decomposition liquid, the decomposition liquid can be decomposed at the anode electrode part 51 to generate hypochlorous acid or hypochlorite ions.

By using a potassium hydrogen carbonate aqueous solution as the decomposition liquid, the decomposition liquid can be decomposed at the anode electrode part 51 to generate hydrogen peroxide.

In addition, by using sulfuric acid as the decomposition liquid, the decomposition liquid can be decomposed at the anode electrode part 51 to generate persulfuric acid, and by using io as the decomposition liquid, periodate can be generated. By using trivalent cerium as the decomposition liquid, the decomposition liquid can be decomposed at the anode electrode part 51 to generate tetravalent cerium, and by using cyclohexane as the decomposition liquid, cyclohexane/cyclohexal can be generated.

Here, when a sodium chloride aqueous solution is used as the decomposition liquid, hypochlorite ions or hypochlorous acid generated when the decomposition liquid is decomposed are dissolved in the decomposition liquid, and thus there is a problem that the hypochlorite ions or hypochlorous acid cannot be extracted as anode generating gas. Therefore, the hydrogen production device 300 suitable for using a sodium chloride aqueous solution as the decomposition liquid will be described as a second embodiment. The same components as those of the hydrogen production device 1 according to the first embodiment are denoted by the same reference signs, and the description thereof will be omitted. The same applies hereinafter.

Figure 16:
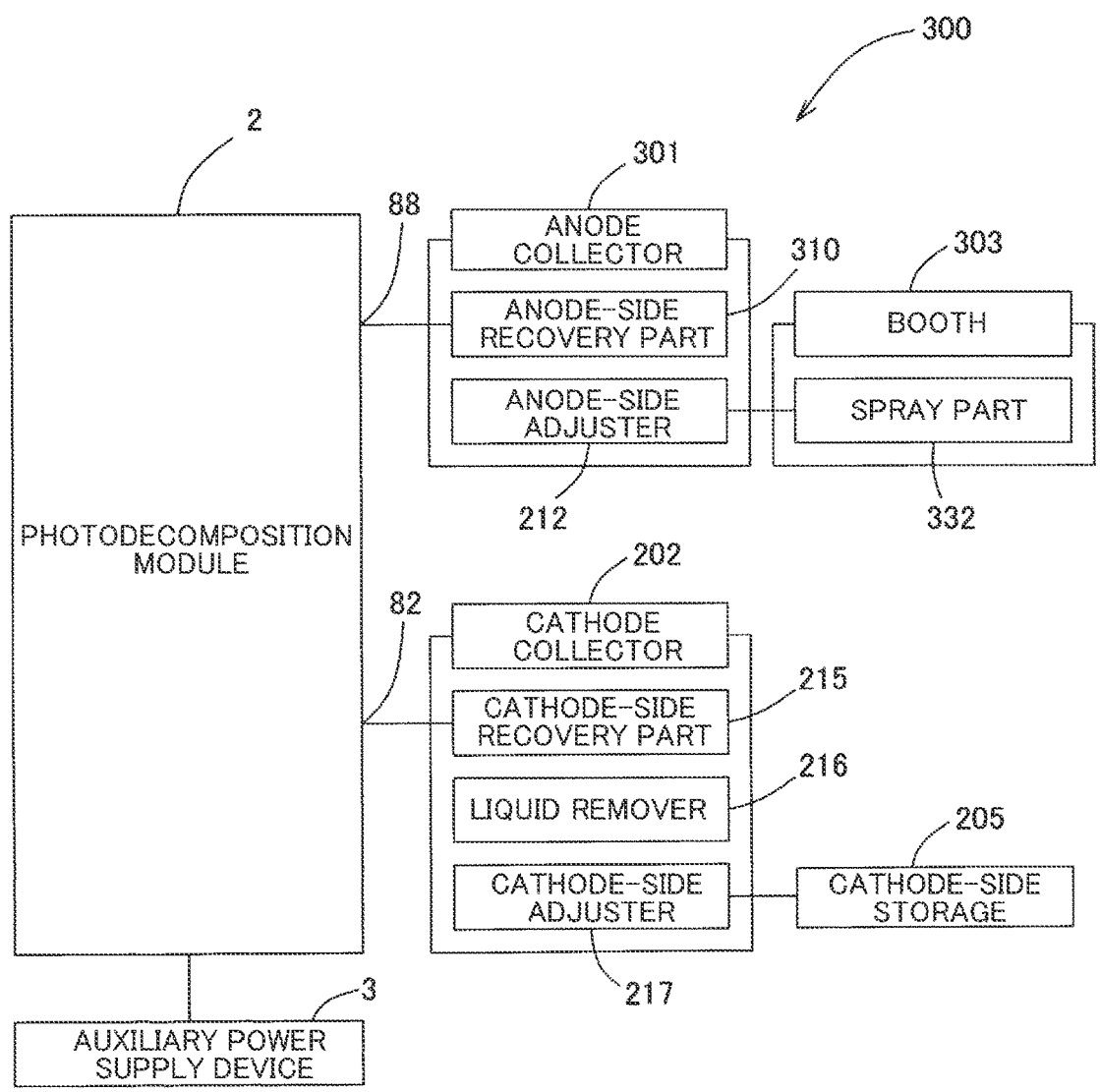
FIG. 16 is a configuration diagram of a hydrogen production device according to a second embodiment of the present invention.

As shown in FIG. 16, the hydrogen production device 300 according to the second embodiment includes the photodecomposition module 2, the auxiliary power supply device 3, an anode collector 301, the cathode collector 202, a booth 303, and the cathode-side storage 205, and the cathode-side storage 205 is attachable to and detachable from the cathode collector 202.

The hydrogen production device 300 can suitably use a chloride aqueous solution such as a sodium chloride aqueous solution or a potassium chloride aqueous solution as the decomposition liquid. That is, the photodecomposition cell 6 decomposes the decomposition liquid to generate an anode product (hypochlorite ions or hypochlorous acid) at the anode electrode part 51, and generates hydrogen gas at the cathode electrode part 52.

As shown in FIG. 16, the anode collector 301 includes an anode-side recovery part 310 and the anode-side adjuster 212.

The anode-side recovery part 310 is a part that is connected to the liquid discharge part 88 of the photodecomposition module 2 via a liquid discharge pipe (not shown) and recovers the decomposition liquid containing the anode product discharged from the liquid discharge part 88 of the photodecomposition module 2.

The anode-side adjuster 212 is a part that supplies the decomposition liquid recovered by the anode-side recovery part 310 to the booth 303 as an oxidant liquid.

The anode-side adjuster 212 can adjust a supply amount of the oxidant liquid to the booth 303.

Figure 17A:
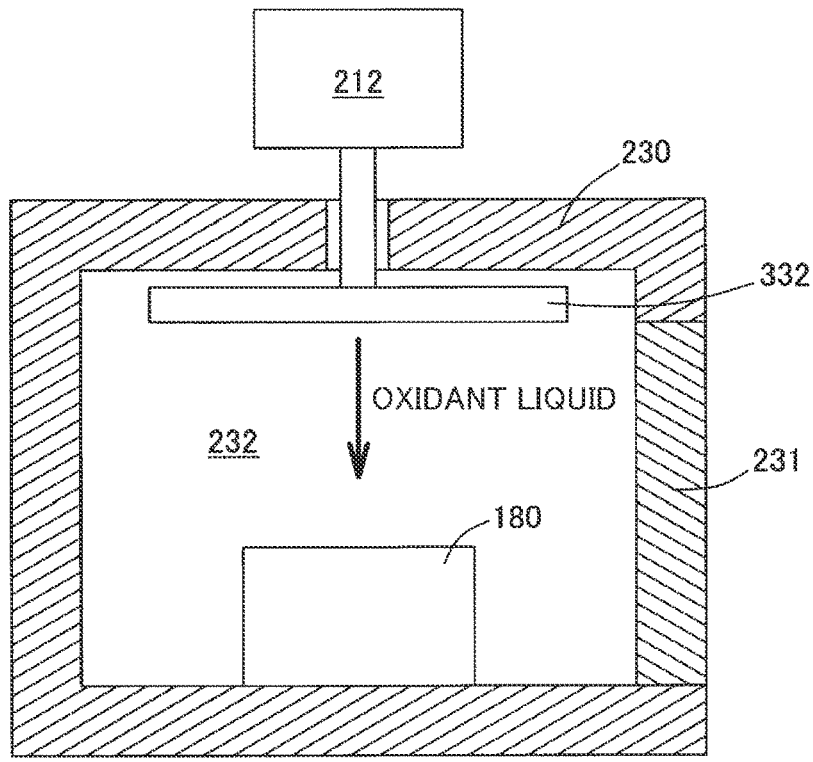
Figure 17B:
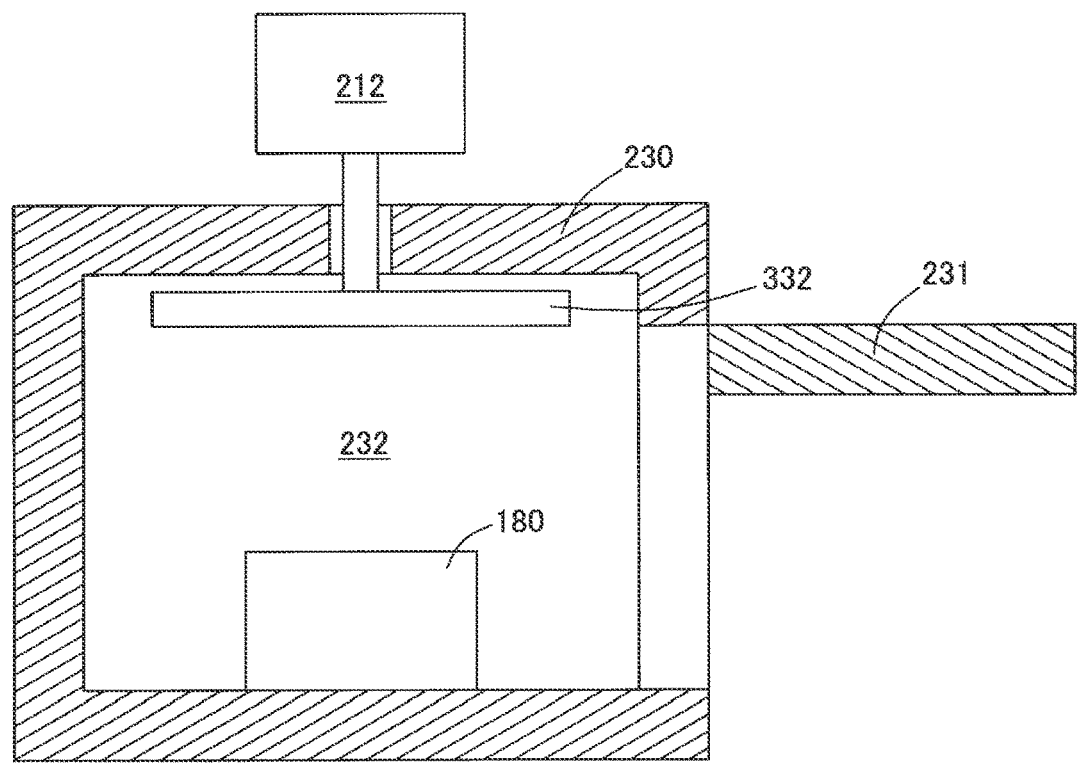

As shown in FIGS. 17A and 17B, the booth 303 includes the casing part 230, the blockade member 231, and a spray part 332.

Specifically, the spray part 332 is a nebulizer, and can spray an oxidant liquid in an atomized form to the internal space 232 of the casing part 230.

When the object 180 to be disinfected is disinfected using the hydrogen production device 1 according to the present embodiment, first, as shown in FIG. 17B, the blockade member 231 is opened to set the booth 303 in the open posture, and as shown in FIG. 17A, the object 180 to be disinfected is disposed in the internal space 232, and the blockade member 231 is closed to set the booth 303 in the closed posture. Then, the decomposition liquid recovered by the anode-side recovery part 310 is sprayed from the spray part 332 to the object 180 to be disinfected as an oxidant liquid.

When the oxidant liquid is sufficiently sprayed onto the object 180 to be disinfected and a predetermined time elapses, as shown in FIG. 17B, the blockade member 231 is opened again to bring the booth 303 into the open posture, and the object 180 to be disinfected is taken out from the booth 203.

In the second embodiment, since a sodium chloride aqueous solution is used as the decomposition liquid, when the decomposition liquid is decomposed, the decomposition liquid becomes a mixed solution of hypochlorous acid water, sodium hypochlorite, and sodium chloride aqueous solution.

In the space 110 on a side of the anode electrode part 51 of the photodecomposition cell 6, hypochlorite ions or hypochlorous acid is generated from the decomposition liquid, a pH value of the decomposition liquid in the space 110 decreases, and strongly acidic hypochlorous acid water having a pH of 2.2 to 2.7 is generated. On the other hand, in the space 111 on a side of the cathode electrode part 52, hydrogen gas is evolved from the decomposition liquid, and the pH value of the decomposition liquid increases.

In the hydrogen production device 1 according to the second embodiment, since the space 110 and the space 111 communicate with each other through the liquid level adjusting hole 96, the decomposition liquid moves back and forth and is neutralized. Then, weakly acidic hypochlorous acid water having a pH of 2.7 to 5 is generated, and the weakly acidic hypochlorous acid water is discharged from the liquid discharge part 88 to the anode-side recovery part 310 as an oxidant liquid.

As described above, in the hydrogen production device 1 according to the present embodiment, the object 180 to be disinfected can be disinfected with the weakly acidic hypochlorous acid water having antibacterial and antiviral activities and excellent safety.

In the hydrogen production device 300 according to the second embodiment, while the anode-side recovery part 310 recovers the decomposition liquid in the accommodating part 50 discharged from the liquid discharge part 88 of the photodecomposition module 2, the decomposition liquid is replenished from the liquid supply part 87 into the accommodating part 50 to be in a steady state. Therefore, hydrogen gas can be stably generated at all times.

The hydrogen production device 300 according to the second embodiment can generate the oxidant liquid in which unstable and easily decomposed hypochlorite ions or hypochlorous acid is dissolved on the spot. Since the oxidant liquid can be quantitatively sprayed to the object 180 to be disinfected, the hypochlorite ions or hypochlorous acid hardly disappear due to their change to chlorine gas. Therefore, the disinfection function is high.

In the above embodiment, each rail 60 to 63 is constituted by the pair of protruding strips extending continuously, but the present invention is not limited thereto. The rails 60 to 63 may be constituted by protruding strips formed by intermittently arranging protrusions.

Figure 18:
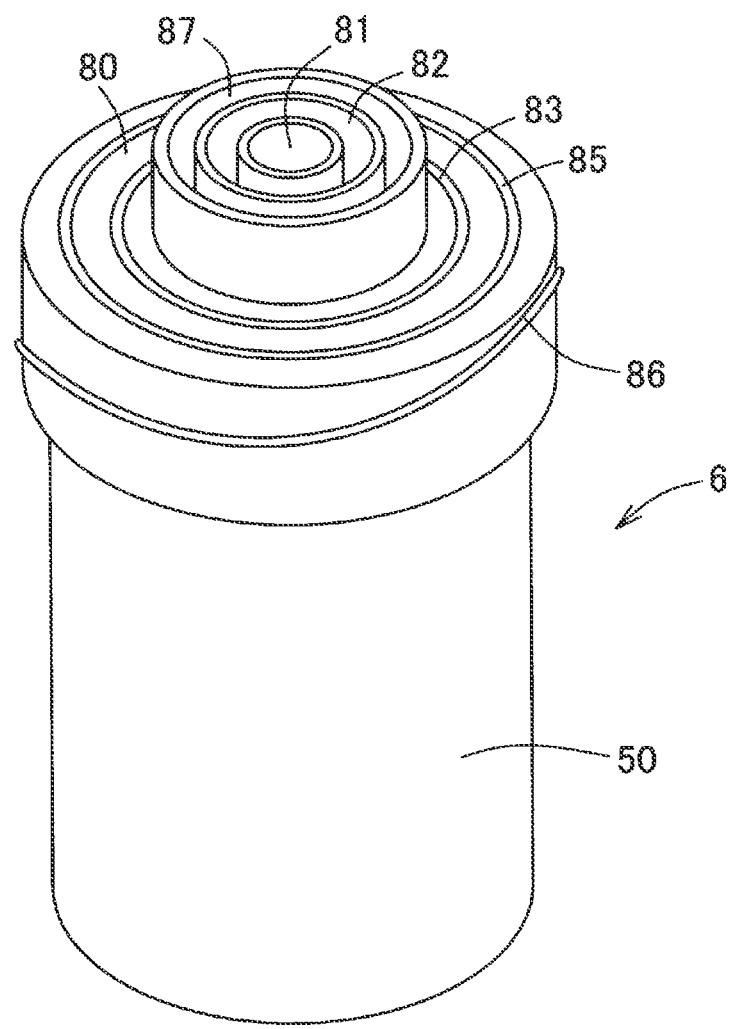
FIG. 18 is a perspective view of a photodecomposition cell according to another embodiment of the present invention.

In the above embodiment, the photodecomposition cell 6 is attached to the mounting part 126 by engaging the cell-side engagement part 86 with the attachment-side engagement part 127 of the pipe structure 7, but the present invention is not limited thereto. The photodecomposition cell 6 may be attached to the mounting part 126 by screwing the cell-side engagement part 86 with the attachment-side engagement part 127 of the pipe structure 7. In this case, as shown in FIG. 18, the first gas discharge part 81, the second gas discharge part 82, the first terminal 83, and the second terminal 85 are preferably provided coaxially with each other.

In the above embodiment, the photodecomposition cell 6 is not rotatable in a circumferential direction about the central axis of the accommodating part 50, but the present invention is not limited thereto. The photodecomposition cell 6 may be rotatable in the circumferential direction. For example, by connecting a rotating unit such as a motor to an end of the photodecomposition cell 6 in the axial direction L, the photodecomposition cell 6 can be individually rotated at a desired timing, and bubbles adsorbed near the cathode electrode part 52 and the anode electrode part 51 can be removed. Further, a detector that detects a position of sunlight or a prediction unit that predicts the position of sunlight may be provided to control the rotation such that the photocatalyst 102 of the photodecomposition cell 6 is directly opposed to the sunlight at all times. In this case, as shown in FIG. 18, the first gas discharge part 81, the second gas discharge part 82, the first terminal 83, and the second terminal 85 are also preferably provided coaxially with each other.

Figure 19:
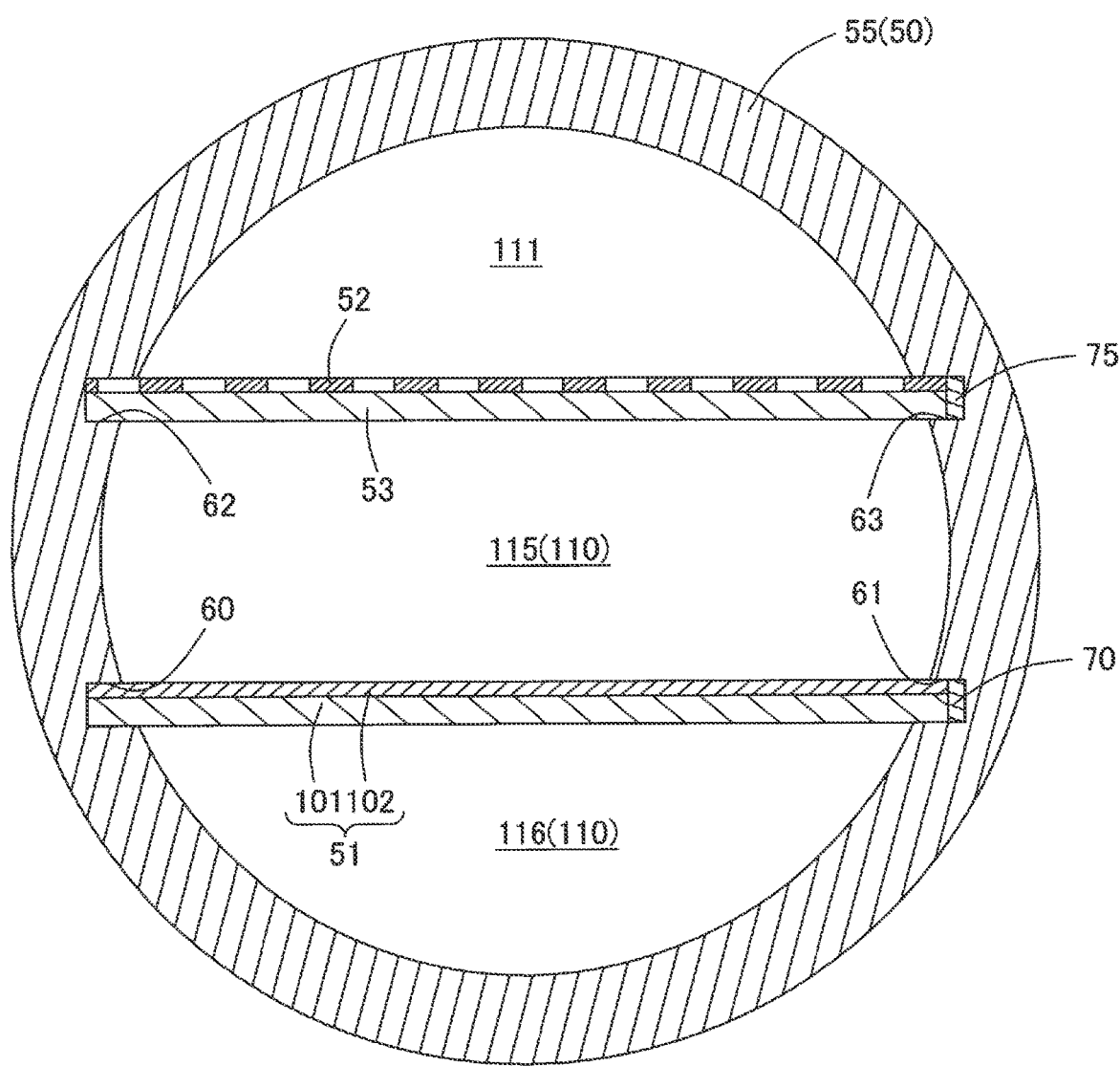
FIG. 19 is a cross-sectional view of a cylinder according to another embodiment of the present invention.

In the above embodiment, the rails 60 to 63 of the cylinder 55 are each configured by two protrusions protruding toward a center in the radial direction with respect to the body wall 58, but the present invention is not limited thereto. As shown in FIG. 19, a part of the body wall 58 may be cut out in the thickness direction, and the rails 60 to 63 may be constituted by recessed grooves having a depth outward in the radial direction.

Figure 20:
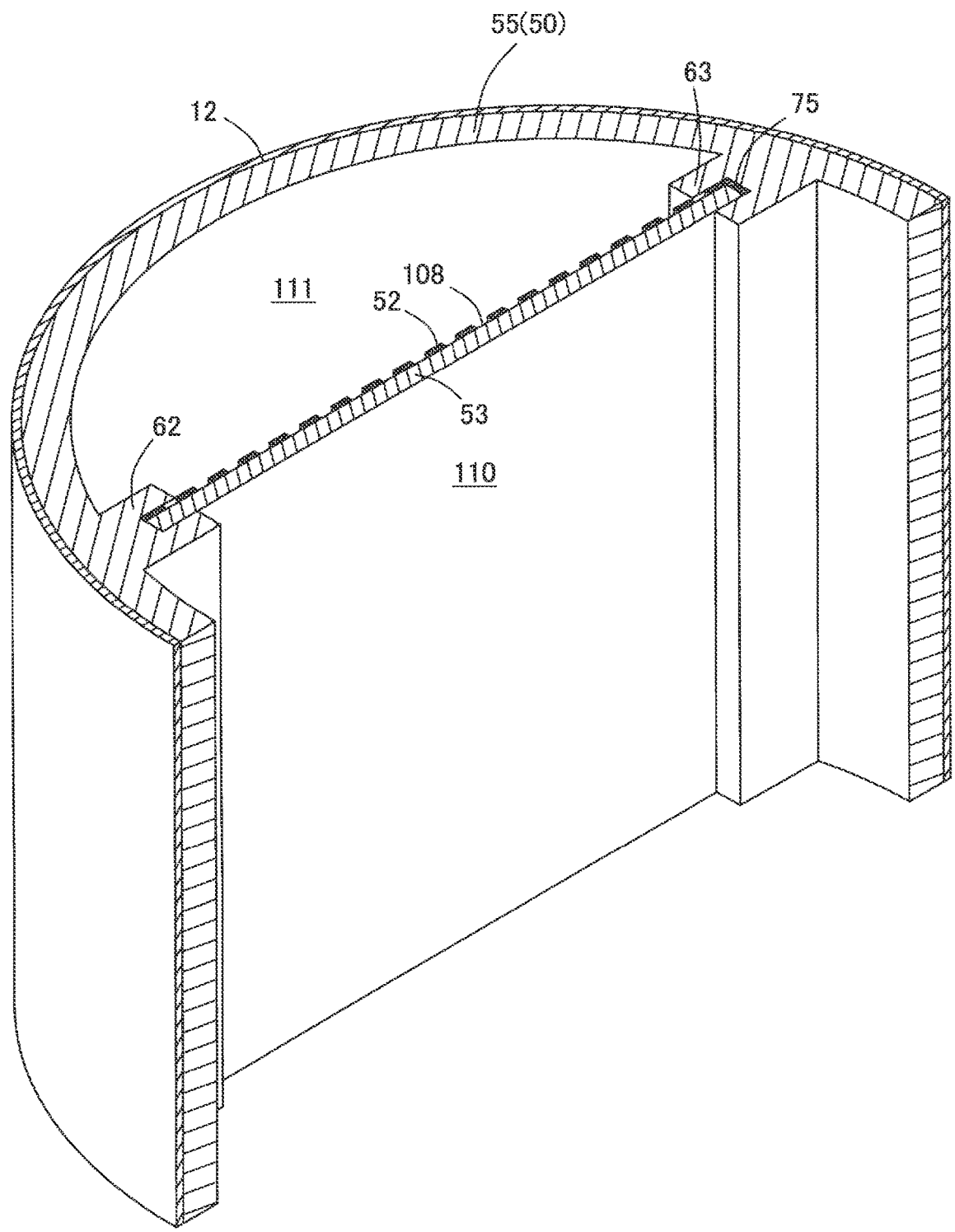
FIG. 20 is a cross-sectional perspective view of a photodecomposition cell according to another embodiment of the present invention.

In the above embodiment, the reflector 12 is provided on a rear side of the posture holder 5, but the present invention is not limited thereto. For example, the reflector 12 may be provided on an inner surface of the first recess 20 of the first holder 10. As illustrated in FIG. 20, the reflector 12 may be provided on an outer surface of the accommodating part 50 of the photodecomposition cell 6. In this way, since the reflector 12 is provided on each photodecomposition cell 6, the reflector 12 is less likely to be stained and is easily maintained.

Figure 21A:
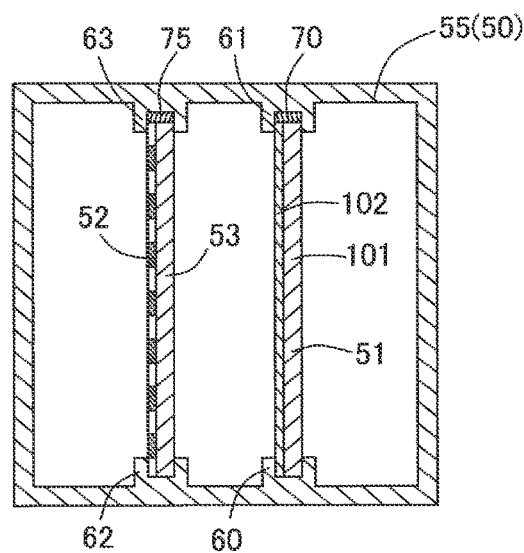
Figure 21B:
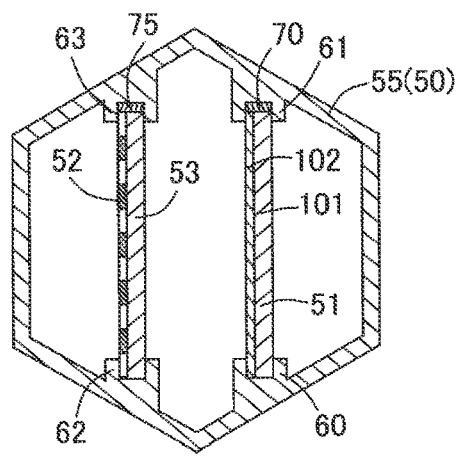
Figure 21C:
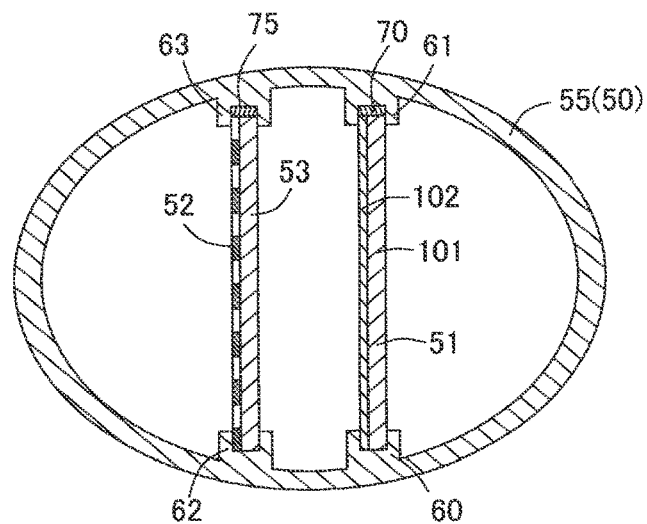

In the above embodiment, a cross-sectional shape of the cylinder 55 is circular, but the present invention is not limited thereto. For example, an outer shape of the cross section of the cylinder 55 orthogonal to the axial direction L may be a regular polygon such as a square (FIG. 21A) or a regular hexagon (FIG. 21B). The cross-sectional shape of the cylinder 55 may be elliptical (FIG. 21C).

Figure 22:
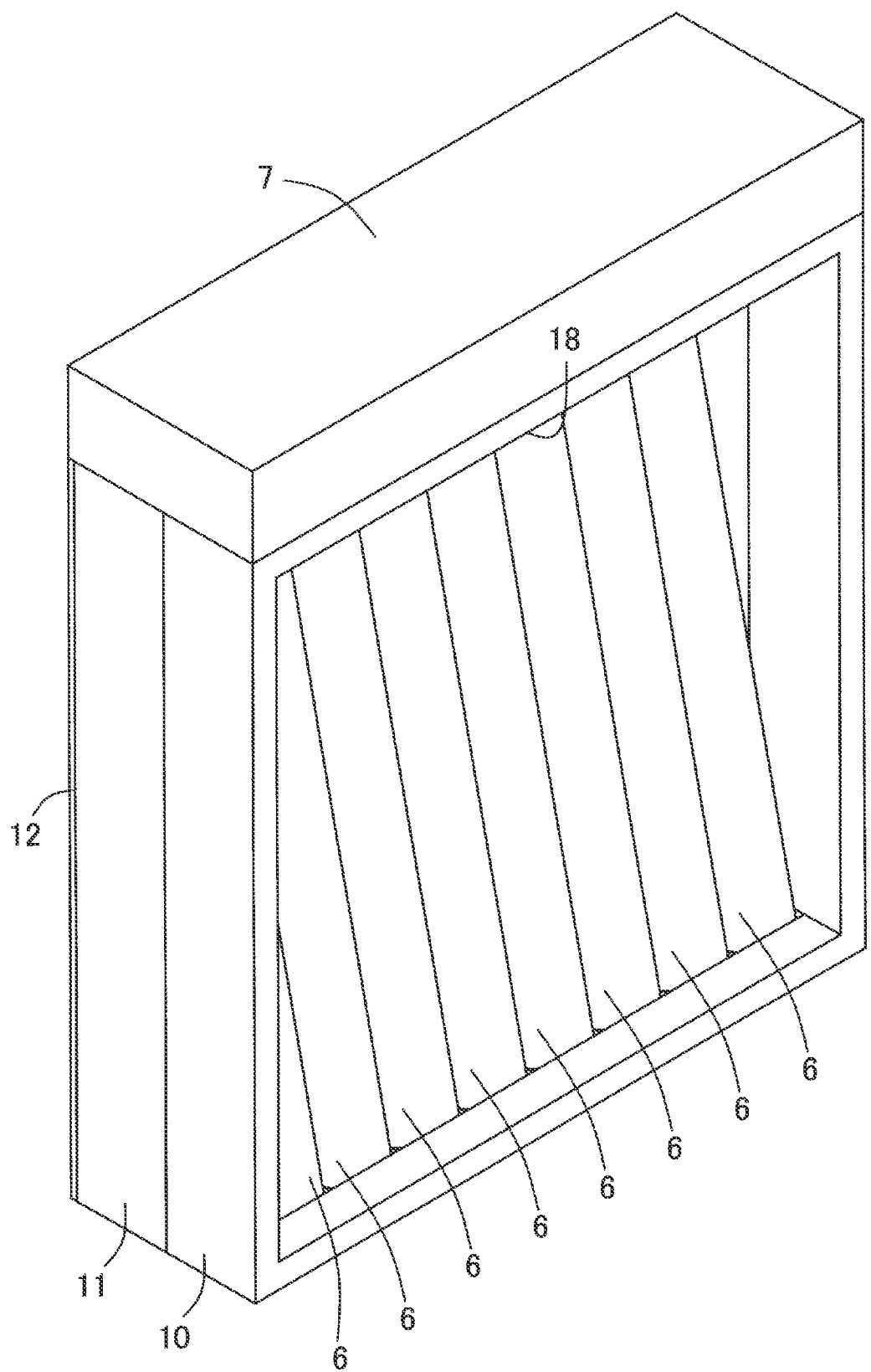
FIG. 22 is a perspective view of a photodecomposition module according to another embodiment of the present invention.

In the above embodiment, the photodecomposition module 2 is inclined with respect to the horizontal plane by the frame in order to further increase time to receive the sunlight, but the present invention is not limited thereto. As illustrated in FIG. 22, the photodecomposition cell 6 may be inclined with respect to the horizontal plane in the posture holder 5. That is, the posture holder 5 may hold the photodecomposition cell 6 such that the axial direction L of the accommodating part 50 of the photodecomposition cell 6 intersects the horizontal plane. This makes it possible to incline the photodecomposition cell 6 toward the sun when the photodecomposition cell 6 is used for a building material or the like that does not incline, such as a window, and to improve an amount of received light.

Figure 23:
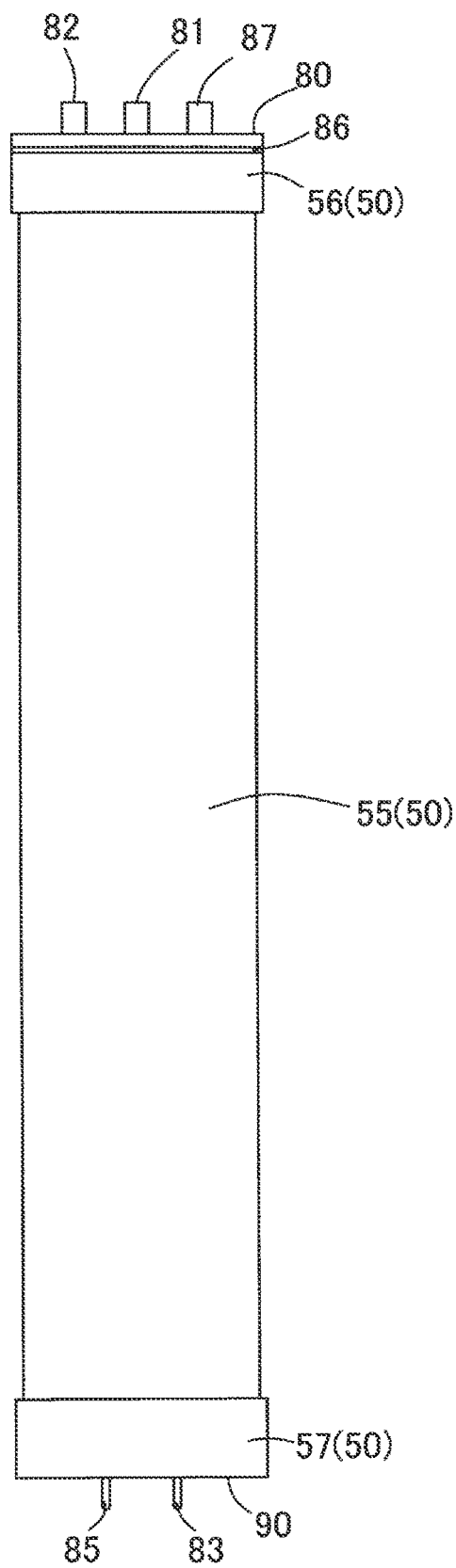
FIG. 23 is a front view of a photodecomposition cell according to another embodiment of the present invention.

In the above embodiment, both the gas discharge parts 81 and 82 and the terminals 83 and 85 are provided in the upper blockade member 56, but the present invention is not limited thereto. For example, as shown in FIG. 23, the gas discharge parts 81 and 82 may be provided in the upper blockade member 56, and the terminals 83 and 85 may be provided in the lower blockade member 57.

In the above embodiment, the photodecomposition module 2 and the auxiliary power supply device 3 are installed on the ground of an idle land or on the ground in a site of a building such as a shelter, but the present invention is not limited thereto. The photodecomposition module 2 and the auxiliary power supply device 3 may be installed on a roof, a wall, a floor, or the like of a fixed structure such as a building.

In the above embodiment, the reflector 12 is provided to reflect the light passing through the photodecomposition cell 6 toward the first holder 10, but the present invention is not limited thereto. The reflector 12 need not be provided. It is also possible to use a flat plate or a reflecting plate provided on a back side of the photodecomposition module 2 without providing the reflector 12. The reflecting plate only has to include a material having high reflectance, such as a metal plate plated with a silver mirror, subjected to mirror surface finishing.

In the above embodiment, the anode electrode part 51 is configured to electrically connect the plurality of anode electrode pieces 100, but the present invention is not limited thereto. The anode electrode part 51 may be constituted by one anode electrode piece 100.

In the first embodiment, a case where water is used as the decomposition liquid has been described, but the present invention is not limited thereto. The decomposition liquid may be an electrolyte solution in which pH is adjusted by adding sodium hydrogen carbonate, disodium hydrogen phosphate, sodium hydroxide, potassium hydroxide, or the like.

In the above embodiment, the same decomposition liquid is used in each photodecomposition cell 6, but the present invention is not limited thereto. Different decomposition liquids may be used for the respective photodecomposition cells 6.

In the above embodiment, the case where the solar cell module is used as the auxiliary power supply device 3 has been described, but the present invention is not limited thereto. For example, a geothermal power generator, a wind power generator, or the like may be used as the auxiliary power supply device 3.

Figure 24:
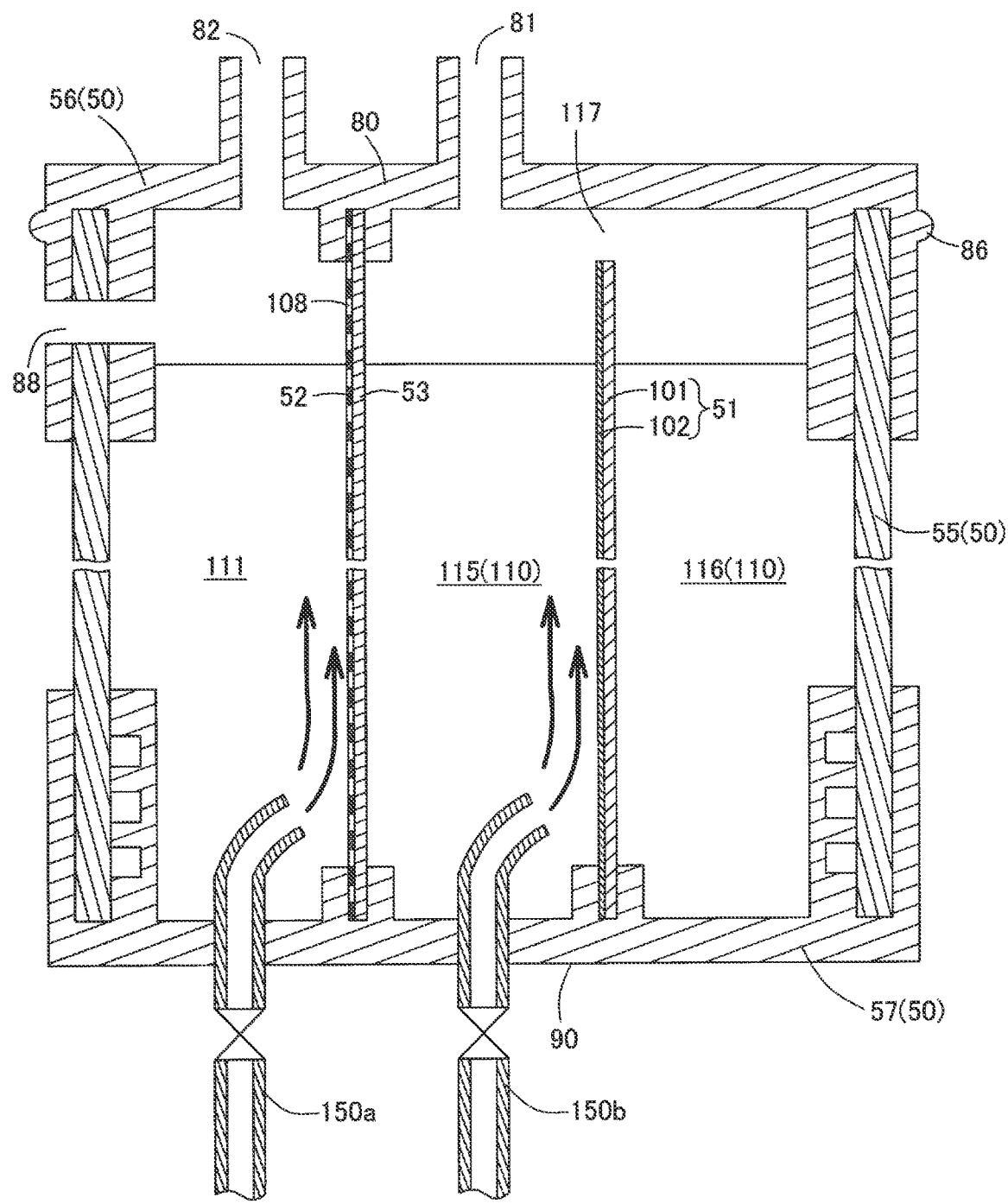
FIG. 24 is an end view of a longitudinal cross-section of a photodecomposition cell according to another embodiment of the present invention.

In the above embodiment, as shown in FIG. 24, liquid supply parts 150*a* and 150*b* for the decomposition liquid may be provided in the lower blockade member 57, the decomposition liquid may be supplied from the outside into each photodecomposition cell 6, and the decomposition liquid may be constantly replenished to a constant liquid level. In this case, a tip nozzle of the liquid supply part 150*b* preferably supplies the liquid toward the photocatalyst 102 of the anode electrode part 51. Thus, the gas evolved on a surface of the photocatalyst 102 can be easily removed from the photocatalyst 102, and the photolysis efficiency can be improved.

Further, the upper blockade member 56 and the cylinder 55 may be provided with the liquid supply parts 150*a* and 150*b* for the decomposition liquid.

In the above embodiment, a case has been described where the conductive mesh is used as the cathode electrode part 52, but the present invention is not limited thereto. A conductive wire may be used as the cathode electrode part 52. The conductive wire may include a similar material as the conductive mesh.

Figure 25:
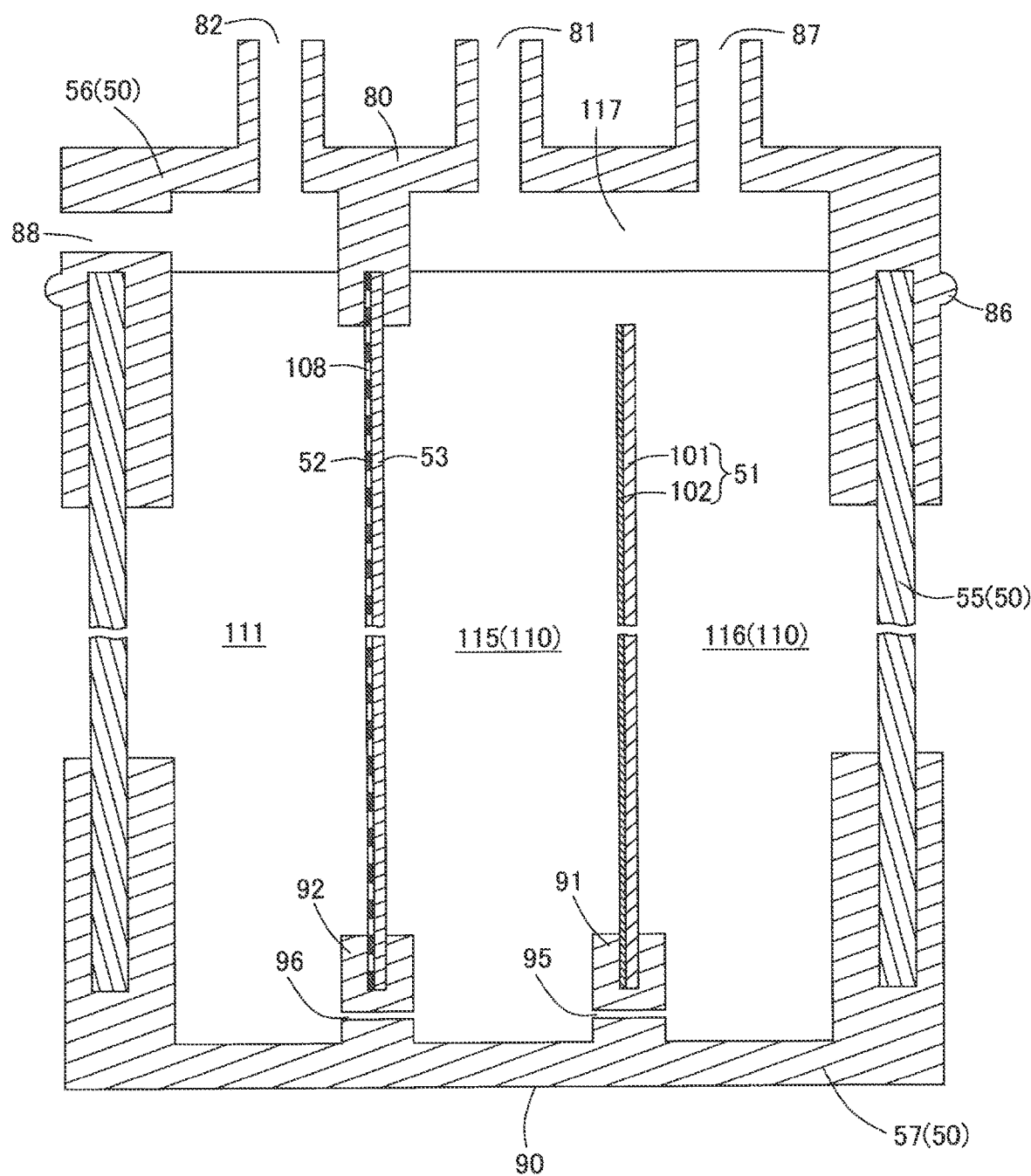
FIG. 25 is an end view of a longitudinal cross-section of a photodecomposition cell according to another embodiment of the present invention.

In the above embodiment, the liquid discharge part 88 is provided across the cylinder 55 and the upper blockade member 56 in the photodecomposition cell 6, but the present invention is not limited thereto. As illustrated in FIG. 25, the liquid discharge part 88 may be provided only in the upper blockade member 56 in the photodecomposition cell 6.

Figure 26:
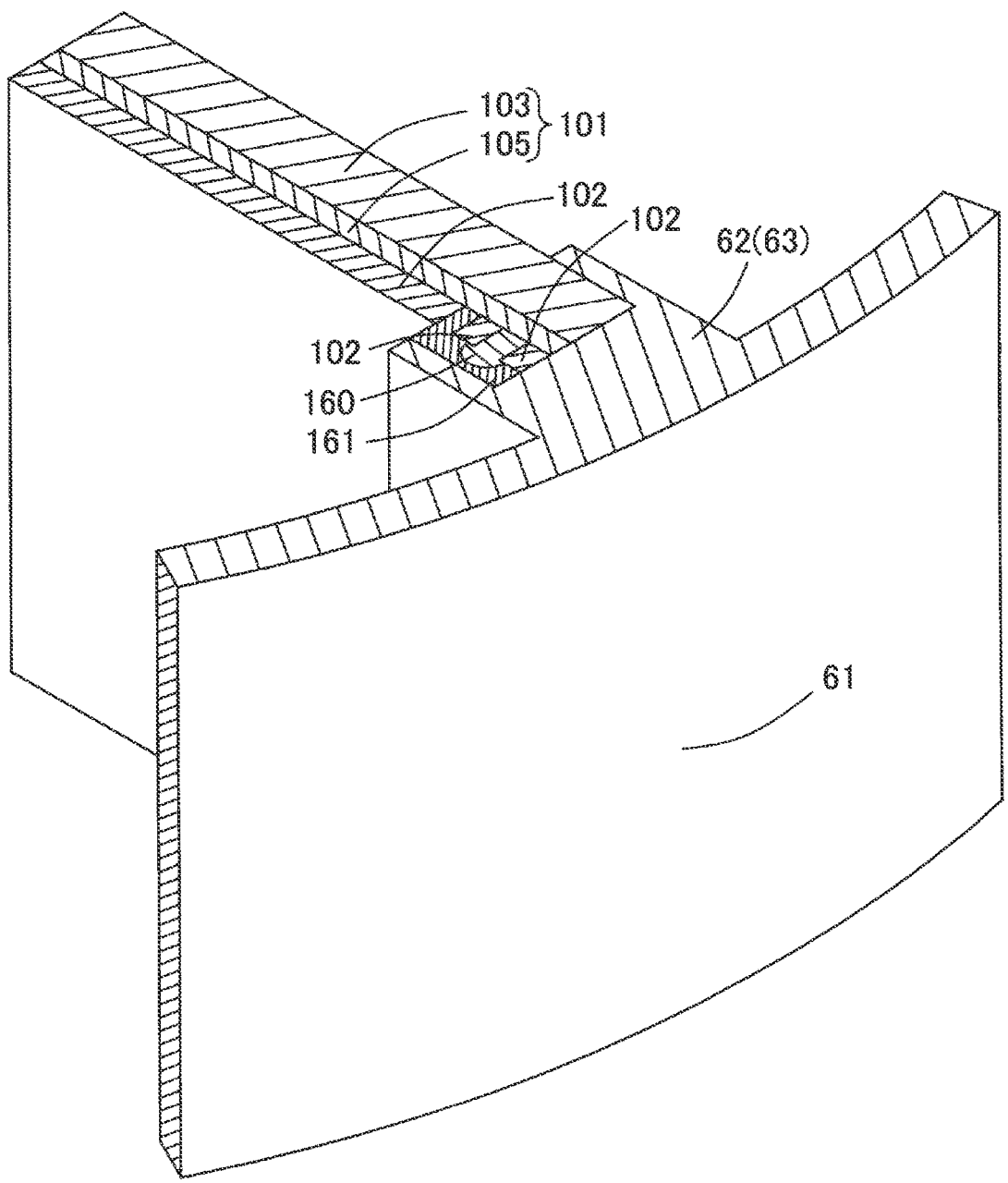
FIG. 26 is a cross-sectional perspective view of a photodecomposition cell according to another embodiment of the present invention.

In the above embodiment, the first wiring member 70 is a member separate from the anode electrode part 51, but the present invention is not limited thereto. The first wiring member 70 may be incorporated in the anode electrode part 51. For example, as shown in FIG. 26, a metal layer 160 may be formed on the transparent conductive layer 105 by plating, sputtering, or the like, and the metal layer 160 may be used as the first wiring member 70. In this case, the metal layer 160 is preferably buried by the sealing member 161. Thus, the metal layer 160 can be prevented from being directly exposed to the decomposition liquid, and durability is improved. In addition, in this configuration, since the metal layer 160 can be in contact with the transparent conductive layer 105 with a certain width, a resistance loss can be further reduced.

In the above embodiment, the cathode-side storage 205 is constituted by the hydrogen tank, but the present invention is not limited thereto. The cathode-side storage 205 may be constituted by a hydrogen capsule.

In the second embodiment, the decomposition liquid in the space 110 on the side of the anode electrode part 51 and the decomposition liquid in the space 111 on the side of the cathode electrode part 52 of the photodecomposition cell 6 are mixed by the liquid level adjusting hole 96 to obtain the oxidant liquid of weakly acidic hypochlorous acid water, but the present invention is not limited thereto.

Without providing the liquid level adjusting hole 96, without mixing the decomposition liquid in the space 110 on the side of the anode electrode part 51 of the photodecomposition cell 6 and the decomposition liquid in the space 111 on the side of the cathode electrode part 52, the decomposition liquid in the space 110 on the side of the anode electrode part 51 may be recovered by the anode collector 301 as an oxidant liquid of strongly acidic hypochlorous acid water having a pH of 2.2 to 2.7.

Further, the decomposition liquid may be decomposed without providing the ion exchanger 53, and the decomposition liquid in the space 110 on the side of the anode electrode part 51 of the photodecomposition cell 6 and the decomposition liquid in the space 111 on the side of the cathode electrode part 52 may be completely mixed and recovered by the anode collector 301 as an oxidant liquid of slightly acidic hypochlorous acid water having a pH of 5 to 6.5.

In the second embodiment, the decomposition liquid is mixed in the photodecomposition cell 6 to adjust the pH of the oxidant liquid, but the present invention is not limited thereto. A pH concentration of the oxidant liquid may be adjusted by neutralizing the decomposition liquid outside the photodecomposition cell 6.

As an application example of the above embodiment, the first holder 10 may be a plate shape without providing the light transmission hole 18, and an antiglare function or a light containment function may be added by providing surface irregularities or an antireflection sheet. A method of forming the surface irregularities is not limited. For example, irregularities may be formed directly on a surface of the first holder 10, or irregularities may be formed on the surface of the first holder 10 by hardening silica or the like with a binder. Further, a sheet having surface irregularities formed in advance may be attached to the surface of the first holder 10.

As in the above embodiment, a hydrogen supply system derived from renewable energy is configured to be connected to a hydrogen tank such as a hydrogen storage tank or a hydrogen storage unit including a hydrogen storage alloy. Furthermore, this hydrogen supply system can be combined with a stationary fuel cell or a micro gas turbine to provide a net-zero energy conversion solution for suppressing energy consumption of a building. This hydrogen supply system can be combined with the hydrogen compression device to be utilized as a hydrogen supply base to a moving body such as a fuel cell vehicle or a fuel cell forklift. The present invention can be used as a small-scale distributed hydrogen supply system for a fuel cell unmanned aerial vehicle (UAV or drone) in which cruising time and a payload are expected to increase.

As an application example of the photodecomposition module 2 according to the above embodiment, the photodecomposition module 2 may be used for an artificial photosynthesis apparatus that generates an organic compound from carbon dioxide in atmosphere.

In the above embodiment, each component can be freely replaced or added between the embodiments as long as it is within the technical scope of the present invention.

EXPLANATION OF REFERENCE CHARACTERS 1, 300: Hydrogen production device (decomposition system, shelter assisting system, or living environment sustaining system)
2: Photodecomposition module (decomposer)
5: Posture holder
6: Photodecomposition cell
10: First holder
11: Second holder
12: Reflector
50: Accommodating part
51: Anode electrode part
52: Cathode electrode part
53: Ion exchanger
55: Cylinder (light transmitter)
60, 61: First rail (holding recess)
70: First wiring member (wiring line)
81: First gas discharge part
82: Second gas discharge part
87, 150a, 150b: Liquid supply part
95, 96: Liquid level adjusting hole
100: Anode electrode piece
101: Transparent conductive substrate
102: Photocatalyst
110: First gas evolution space
111: Second gas evolution space
180: Object to be disinfected
201, 301: Anode collector
202: Cathode collector
203, 303: Booth
205: Cathode-side storage
211: Oxidant gas generator
212: Anode-side adjuster
216: Liquid remover
217: Cathode-side adjuster
332: Spray part

The invention claimed is:

1. A decomposition system comprising:
a photodecomposition module and an auxiliary power supply device,
wherein the photodecomposition module comprises:
a plurality of photodecomposition cells;
a posture holder that holds each of the photodecomposition cells in a predetermined posture; and
a pipe structure,
wherein each of the photodecomposition cells decomposes a decomposition liquid with light irradiation, including an anode electrode part and a cathode electrode part in an accommodating part,
wherein the anode electrode part includes a photocatalyst supported on a conductive substrate,
wherein the anode electrode part and the cathode electrode part are immersed in the decomposition liquid in the accommodating part, and
wherein the accommodating part has:
a cylindrical shape;
a first terminal electrically connected to the anode electrode part; and
a second terminal electrically connected to the cathode electrode part, wherein the pipe structure has:
a first wiring line that electrically connects the auxiliary power supply device and the first terminal of each of the photodecomposition cells; and
a second wiring line that electrically connects the auxiliary power supply device and the second terminal of each of the photodecomposition cells, and wherein each of the photodecomposition cells is:
independently attachable to and detachable from the pipe structure; and
electrically connected in parallel to the auxiliary power supply device.

2. The decomposition system according to claim 1, wherein the anode electrode part includes a plurality of anode electrode pieces arranged side by side in an axial direction of the accommodating part with electrical connection to each other.

3. The decomposition system according to claim 1, wherein each of the photodecomposition cells is independently attachable to and detachable from the posture holder.

4. The decomposition system according to claim 1, wherein the accommodating part is configured to transmit light in a direction intersecting with an axial direction, wherein the posture holder includes a reflector that reflects light, and
wherein the posture holder holds the photodecomposition cell so that the photocatalyst of the conductive substrate faces the reflector.

5. The decomposition system according to claim 1, wherein the photodecomposition cell decomposes the decomposition liquid to evolve gas with light irradiation, further including an ion exchanger in the accommodating part,
wherein the ion exchanger is provided between the anode electrode part and the cathode electrode part to divide an inside of the accommodating part into a first gas evolution space to which the anode electrode part belongs and a second gas evolution space to which the cathode electrode part belongs,
wherein the accommodating part is provided with a liquid level adjusting hole that communicates the first gas evolution space with the second gas evolution space to adjust a liquid level of the decomposition liquid, and
wherein the photodecomposition module includes a first gas discharge part that communicates the first gas evolution space with an outside and a second gas discharge part that communicates the second gas evolution space with the outside.

6. The decomposition system according to claim 1, wherein the photodecomposition cell includes a holding recess that holds an end of the anode electrode part, and
wherein the holding recess extends in an axial direction of the accommodating part over the accommodating part, satisfying either the following (1) or (2):
(1) the holding recess is a recessed groove that is a cut-out portion of an inner wall of the accommodating part; or (2) the accommodating part incudes a pair of protrusions protruding from an inner wall of the accommodating part, and the holding recess is a recessed groove sandwiched between the pair of protrusions with a depth toward the inner wall of the accommodating part.

7. The decomposition system according to claim 1, wherein the photodecomposition cell includes a wiring line and a holding recess, wherein the anode electrode part includes a plurality of anode electrode pieces, wherein the wiring line electrically connects the anode electrode pieces to each other, wherein the holding recess extends in an axial direction of the accommodating part and holds an end of each of the anode electrode pieces, and wherein the wiring line is disposed between a bottom of the holding recess and an end surface of each of the anode electrode pieces.

8. The decomposition system according to claim 1,
wherein the posture holder is configured to rotate the photodecomposition cell in a circumferential direction.

9. The decomposition system according to claim 1,
wherein the photodecomposition cell decomposes the decomposition liquid and evolves gas with light irradiation, wherein the photodecomposition cell includes a gas discharge part at an end in an axial direction of the accommodating part, and wherein the posture holder holds the photodecomposition cell such that the axial direction of the accommodating part intersects with a horizontal plane.

10. The decomposition system according to claim 1, further comprising:

a liquid supply part that supplies the decomposition liquid, wherein the liquid supply part supplies the decomposition liquid toward the photocatalyst of the anode electrode part.

\* \* \* \* \*